United States Patent [19]

Cummiskey

[11] 4,229,815
[45] Oct. 21, 1980

[54] FULL DUPLEX BIT SYNCHRONOUS DATA RATE BUFFER

[75] Inventor: Peter Cummiskey, Clark, N.J.

[73] Assignee: Bell Telephone Laboratories, Incorporated, Murray Hill, N.J.

[21] Appl. No.: 962,226

[22] Filed: Nov. 20, 1978

[51] Int. Cl.³ .................................................. H04J 3/16
[52] U.S. Cl. ...................................... 370/84; 370/85; 370/91; 340/347 DD
[58] Field of Search ......... 179/15 BV, 15 BS, 15 BA; 340/347 DD; 178/69.1, 58 R

[56] References Cited

U.S. PATENT DOCUMENTS

| | | | |
|---|---|---|---|
| 3,480,734 | 11/1969 | Kuroyanagi et al. | 179/15 |
| 3,534,264 | 10/1970 | Blasbalg et al. | 179/15 BV |
| 3,772,653 | 11/1973 | Brown | 340/172.5 |
| 3,825,899 | 7/1974 | Haeberle | 340/172.5 |
| 4,046,972 | 9/1977 | Huizinga | 179/99 |
| 4,048,440 | 9/1977 | Peck | 178/69.1 |
| 4,063,041 | 12/1977 | Vollnhals | 179/15 BV |
| 4,138,596 | 2/1979 | Roche | 179/15 BV |

OTHER PUBLICATIONS

"Fifo", *Progress*, vol. 1, No. 4, Fairchild Camera Technical Journal T-46-01, Sep. 1974.
*Bell System Tech. Journal*, vol. 54, No. 5, May-Jun. 1975, "Local Distribution System", p. 919 et seq.
*Bell System Tech. Journal*, Jan. 1962, vol. 41, p. 25 et seq., "A Bipolar Repeater for Pulse Code Modulation Signals".

*Primary Examiner*—Douglas W. Olms
*Attorney, Agent, or Firm*—John A. Caccuro

[57] ABSTRACT

The disclosed full duplex bit synchronous data rate buffer (15) adapts high speed burst data signals for transmission over low speed data facilities. The data rate buffer (15) includes a buffer control circuit (201-205, 105) for interactively controlling a first data buffer (101) for down-converting the high speed signals (107) to low speed signals (109) and a second data buffer (102) for up-converting low speed data signals (108) to high speed burst data signals (106). The data rate buffer (15) accepts random changes in the length of each high speed burst data signal without a loss in bit synchronism and adjusts for changes in the number of burst data signals contained in each frame.

43 Claims, 15 Drawing Figures

FULL DUPLEX BIT SYNCHRONOUS DATA RATE BUFFER

TECHNICAL FIELD

This invention relates to data conversion buffers and specifically to the buffering of high speed asynchronous data onto low speed synchronous transmission channels.

BACKGROUND OF THE INVENTION

Modern digital electronic equipment has the capability for communications at very high bit rates. When this high speed equipment communicates with low speed equipment a transmission disparity exists. This problem also exists when high speed equipment interfaces with low speed telephone facilities. Typically a data rate buffer is used as an interface between equipment having differing data rates. Additionally, data rate buffers are used to interface between facilities which are not in synchronization with each other.

Typically the communications between equipment having different bit rates is bidirectional (full duplex) and requires buffering in each direction. Thus, a bidirectional data rate buffer is used when high speed burst data signals are converted to and from low frequency data signals.

Prior art techniques for interfacing low speed data signals to high speed data signals include the use of data rate buffers for speed expansion and compression. Prior art techniques also include the use of pulse stuffing to achieve the conversion of asynchronous to synchronous signals. Typical of the prior art is U.S. Pat. No. 3,825,899 issued to H. H. Haeberle et al on July 23, 1974. The Haeberle et al patent teaches the use of compression and expansion buffers not only for burst data formation but also for pulse stuffing.

When the bidirectional communications between equipment having different data rates is required to be simultaneous (in bit synchronism) additional buffering problems exist. These problems are further compounded when this bit synchronism is to be maintained when the length of the high speed burst data may vary from one word to the next.

The prior mentioned Haeberle et al patent does not teach compression and expansion (data rate) buffers which operate interactively to transmit and receive in bit synchronism when the number of bits per data burst is variable.

In one typical data rate buffer application a polling centralized controller controls real-time information transfer by using a scanning operation to gather status and to distribute control commands to the slave stations. The communication links between the controller and slave stations typically operate at high data rates compared to the data rate transmission capability of the telephone facility. When the slave station is nearby (within 1000 feet of the controller) high data rate signals can be sent over the telephone facility. Often, however, it is necessary to connect a central controller with remotely located slave stations over conventional telephone lines. In such situations problems occur because of the data rate transmission disparity between the controller and the transmission facility.

One solution to such transmission rate incompatability problems is the use of data buffers at the interface between the high speed and low speed facilities. However, in some situations the problem is compounded in that it is also necessary to maintain full synchronism between the controller and the station. One such system where such a problem would exist for remote stations is described in the pending patent application of Fenton et al, Ser. No. 847,216 filed on Oct. 31, 1977, and incorporated by reference herein. In the Fenton et al application multibutton electronic telephone (MET) sets are periodically polled using high speed burst data signals from a central switching controller to determine the status of buttons and control lamps of the MET sets. The central switching controller is connected to the remotely located MET sets via telephone lines.

In the Fenton et al application the central switching controller polls each MET set in a bit synchronous manner such that a bit is simultaneously received from the MET set for each bit of the poll word transmitted to the MET set. The MET sets have a capability for operating in a partial scan (partial data word) mode or full scan (full data word) mode. Thus, the central controller may scan in an interactive manner, such that the length of the scan word to each MET set may either vary with time or vary with the prior response received from the MET sets. Since the number of MET sets, polled by the central controller may vary from one polling cycle (or frame) to the next, it would be desirable if the system could accommodate such changes in the number of words per frame cycle.

Accordingly, it is a problem to design a bidirectional data rate buffer which converts high speed burst data signals to low speed data signals without losing bit synchronism with either the high speed apparatus or the low speed apparatus when the number of binary bits in the high speed burst signal changes with each frame.

Additionally, it is a problem to design a data rate buffer which can accommodate changes in the number of high speed burst signals per frame.

SUMMARY OF THE INVENTION

The above-discussed problems as well as other problems are overcome by the disclosed bidirectional data rate buffer which is adapted for converting asynchronous high speed burst data signals to synchronous low speed data signals for transmission over long telephone loops. The bidirectional data rate buffer allows for changing the length of each polling burst data signal without a loss in bit synchronism at the low or high speed port. In addition, the data rate buffer allows for changes in the number of bursts per frame with only a loss of synchronization of two frames.

The bidirectional data rate buffer includes a transmit data buffer for down-converting high speed burst data signals to low speed data signals and a receive data buffer for up-converting low speed data signals to high speed burst data signals. The transmit data buffer consists of a multiple channel, first-in first-out (FIFO) shift register which utilizes one channel for data storage and one channel for storing a flag associated with the first bit of each data word. The transmit buffer generates various control signals, one signal (W SYNC 1) indicating the length of high speed data words received and one signal (EMPTY) indicating that the buffer is depleted of received high speed data words.

The receive data buffer consists of a multiple channel FIFO shift register which utilizes one channel for data storage, one channel for storing a flag associated with each data word and one channel for storing a flag associated with a group of data words. The receive buffer utilizes and generates various control signals, one signal (SYNC 1) indicating the length of each high speed word exiting in the receive buffer, a signal (F SYNC) indicating the size of a group of high speed words exiting the receive buffer, and a signal (FRAME) indicating the size of a group of low speed data words received.

The bidirectional data rate buffer also includes a buffer control unit containing alignment logic which utilizes the various control signals to adjust, simultaneously on a bit basis, the length of the high speed data words exiting the receive buffer. The adjusted words are equal to the length of the high speed data words received by the transmit buffer. Synchronizing circuits operate on the data on a bit basis so that the data words exiting the receive buffer are in sync with the high speed data words entering the transmit buffer. The synchronizing circuits also enable reception of low speed data words in sync with the transmission of low speed data words.

A frame recovery circuit provides for frame synchronization when the number of high speed data words per polling frame changes. Two frames are required for resynchronization to a longer frame and one frame for resynchronization to a shorter frame.

The data rate buffer can be utilized as part of a communications system for transmitting and receiving high speed burst data signals over low frequency communication facilities. Such a system would include a data rate buffer and a remote unit. The data rate buffer would include additional circuits for adapting the low speed data signals from its buffers for communication over the low frequency facility.

The remote unit communicates with the data rate buffer using low frequency data signals transmitted and received over the low frequency facility. The remote unit demultiplexes the received low speed data signals and distributes these signals to the appropriate MET set. In addition the remote unit receives low speed data signals echoed from the MET sets and multiplexes the data into low speed data signals for transmission to the data rate buffer over the telephone facility.

DESCRIPTION OF THE DRAWINGS

The foregoing problems and solutions together with the operation and utilization of the present invention will be more apparent from the following detailed description taken in conjunction with the drawings in which.

DETAILED DESCRIPTION

Background

Figure 1:
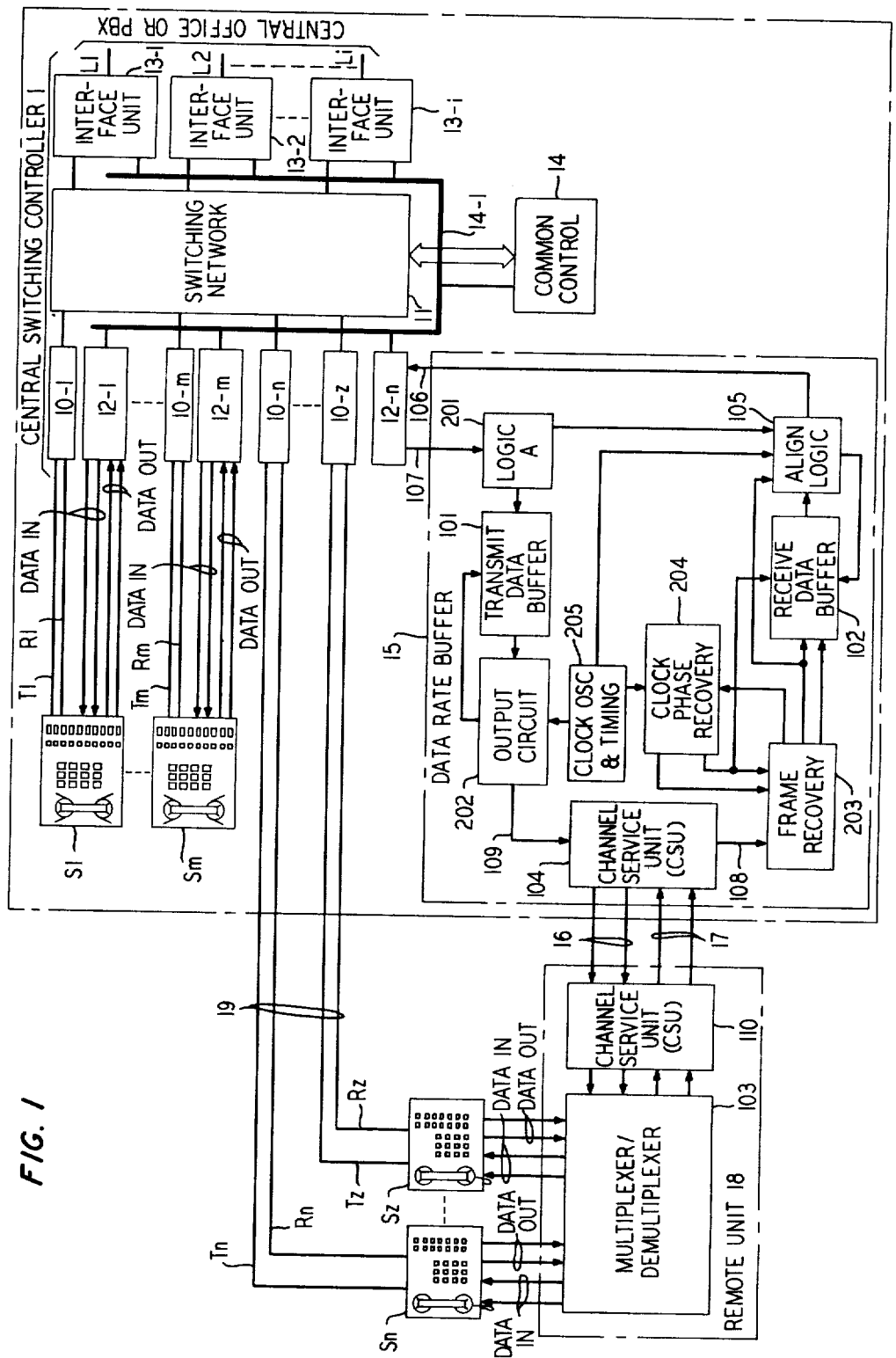
FIG. 1 shows a block diagram of an embodiment of the invention, with the remote unit on the left and with the data rate buffer on the right.

Before describing the detailed circuit operation of the data rate buffer it may be helpful to review in general terms its relationship to other telephone systems. The simplified block diagram of FIG. 1 illustrates the utilization of the data rate buffer in a range extending communication system between remotely located multibutton electronic telephone (MET) sets and a central switching controller. While FIG. 1 illustrates a particular application of the data rate buffer, it is to be understood that the data rate buffer can interface any apparatus having transmission characteristics similar to those of the MET set and central switching controller.

In FIG. 1 there is shown a number of local MET sets designated Sl through Sm. Each of these MET sets is connected by three pairs of wires designated "T & R", "data in", "data out". Each "T & R" pair is connected through an interface unit such as interface unit 10-l, to switching network 11. The "data in" and "data out" pairs are connected through an interface unit such as interface unit 12-l, to common control 14. Switching network 11 serves to interconnect any MET set to any other MET set or to a central office of PBX line. The operation of the switching network as well as the overall operation of one typical central switching controller is described in the pending patent application of Fenton et al, Ser. No. 847,216, filed on Oct. 31, 1977 and which is now U.S. Pat. No. 4,150,259 the description therein is incorporated by reference into this application. Switching network 11 interfaces central switching controller 1 to the central office or PBX lines L1 through Li via line interface units 13-l through 13-i. Common control 14 is connected to interface units 12-l through 12-m and line interface untis 13-l through 13-i via data bus 14-l. As described in the Fenton patent application common control unit 14 controls the call processing in the central switching controller 1.

GENERAL SYSTEM OPERATION

Each station, such as station Sl, and line port, such as 13-l, is scanned to detect any changes in status. The MET sets (Sl-Sm) are periodically polled through their associated interface units (12-l to 12-m) with a high speed (operating at a frequency of 200 Kilobits per second [Kbs]) burst data signal. The communication between the MET sets and the central switching controller 1 occurs in a bit synchronous manner, such that a bit is received from the MET set for each bit of the poll word transmitted to the MET set. In response to any change (e.g., on-hook, off-hook, button depression, etc.), common control 14 issues system commands.

Common control 14 also generates commands via a bidirectional data bus 14-1 to the MET sets. The commands light the light emitting diodes (LEDs) and ring the tone ringers at the MET sets. The operation of the multibutton electronic telephone (MET) set is described in U.S. Pat. No. 4,046,972 issued to Huizinga et al on Sept. 6, 1977 which is incorporated herein by reference.

The polling of the MET sets by central switching controller 1 is interactive, such that the length of the subsequent polling request to a MET set is a function of the content of the previous polling response from that MET set. Typically central switching controller 1 polls a MET set using a partial scan word asking for any gross changes in status at the MET set. If changes in status have occurred, the subsequent scan asks for more details of the status changes. This subsequent scan requires a full scan word.

When the distance between the MET sets and central switching controller 1 exceeds approximately 1,000 feet communication using high speed burst data signals deteriorates requiring a range extender. The range extender must be transparent to the interactive polling characteristics of the central switching controller so that remote MET sets behave like local MET sets.

The disclosed communication system satisfies the above objective and, as shown in FIG. 1, consists of bidirectional data rate buffer 15 and remote unit 18 which are connected by telephone facilities 16, 17 and 19.

Bidirectional data rate buffer 15 of the disclosed communication system is connected to interface unit 12-n and receives scan and control requests from and responds with status information to common control 14. Data communication between common control 14 and bidirectional data rate buffer 15 occur at a 200 Kbs rate. Data rate buffer 15 includes a transmit buffer 101, receive buffer 102, alignment logic 105, channel service unit (CSU) 104, logic A circuit 201, output circuit 202, frame recovery circuit 203, clock phase recovery 204 and clock oscillator and timing circuit 205. Note that the interconnection of the circuits of data rate buffer 15 are symbolically shown in FIG. 1. Data rate buffer 15 converts in a simultaneous bit synchronous manner the high speed (200 Kbs) burst data signal from interface unit 12-n into low speed (10 Kbs) data signals compatible with telephone facilities 16 and 17. Note, the terminology of high speed and low speed signals refer respectively to high frequency and low frequency signals.

Data rate buffer 15 is designed, as will be detailed, to provide bidirectional (full duplex) data rate buffering between a high speed asynchronous burst data signal (from central switching controller 1) and a low speed synchronous data signal (from telephone facilities 16 and 17) such that the number of bits per data burst can be changed by the controller on each polling cycle without affecting either the simultaneous transmit and receive bit synchronism between data rate buffer 15 and controller 1 or the synchronism between data rate buffer 15 and telephone facilities 16 and 17. Thus, data rate buffer 15 is a data rate converter for bidirectional conversion of high speed signals to low speed signals. Note, each high speed burst of data (word) is asynchronous with respect to each low speed data word. However, frame (a group of words) synchronism exists between the high speed data signal and the low speed data signals. Thus, one frame of low speed data is sent for each frame of high speed data received by data rate buffer 15.

Since the high speed burst data signals from central switching controller 1 are much faster than the low speed data signals transmitted over telephone facilities 16 and 17, data rate buffer 15 must store one frame of high speed poll words. Central switching controller 1 must not send another frame of high speed burst data until data rate buffer 15 has completed transmitting the prior polling frame.

A frame is a set of closely spaced data bursts (or words). The bursts must be spaced close enough to prevent the transmit data buffer from emptying before the entire frame has been stored. Although the instantaneous burst data rate from central switching controller 1 is 200 Kbs, the average bit rate is less than the 10 Kbs transmission rate over the telephone facilities 16, 17. Hence, data rate buffer 15 never overflows with data from the central switching controller. As a consequence of the rate buffering the polling response data words (as seen by Switching Controller 1) received from the remote MET sets (Sn-Sz) will be one polling frame old, while the polling response data words from local MET sets (Sl-Sm) are current. This one polling frame delay has not been found to adversely affect the function performed by central switching controller 1.

Figure 2:
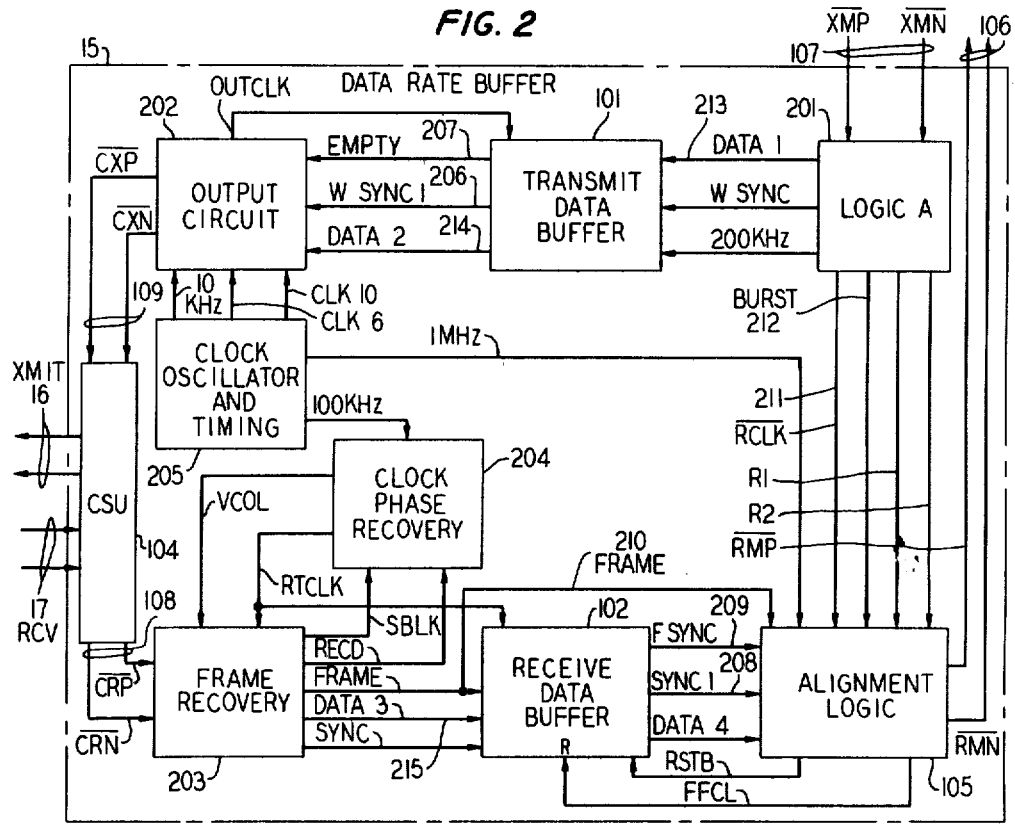
FIG. 2 shows the interconnection of the circuit blocks of the data rate buffer.

Data rate buffer 15, shown in more detail in FIG. 2, includes a transmit buffer 101 for down-converting high speed burst data signals (DATA 1) to low speed constant data signals (DATA 2) and a receive data buffer 102 for upconverting low speed constant data signals (DATA 3) to high speed data signals (DATA 4). Transmit data buffer 101 consists of a multiple channel first-in first-out FIFO 1) shift register which utilizes one channel for data storage (DATA 1) and one channel for storing a flag asociated with the first bit of each data word (W SYNC). Receive data (R) buffer 102 consists of a multiple channel FIFO 2 shift register which utilizes one channel for data storage (DATA 3), a second channel for storing a flag (SYNC) associated with each data word and a third channel for storing a flag (FRAME) associated with the length of a group of data words. It should be noted that buffers 101 and 102 may be implemented using other types of memory devices. Thus, the term buffer refers to a type of memory arrangement. Transmit buffer 101 utilizes its flag bits to generate various control signals, one signal (W SYNC 1) indicating the length of high speed data words received and a signal (EMPTY) indicating the size of a group of received high speed data words. Receive buffer 102 utilizes its flag bits to generate various control signals, one signal (SYNC 1) indicating the length of each high speed word exiting in the receive buffer 102 and a signal (F SYNC) indicating the size of a group or polling frame of high speed words exiting receive buffer 102.

Data rate buffer 15 also includes a variety of control circuits collectively called buffer control circuit (201-205, 105). One circuit alignment logic circuit 105 responds to the various control signals and adjusts, simultaneously on a bit basis, the length of the high speed data words transmitted to central controller 1 over $\overline{RMP}$ and $\overline{RMN}$. The adjustment makes the length of the transmitted words equal to the length of the high speed data words received by transmit buffer 101. Logic A unit 201 generates clock and marker signals for transmit buffer (101) and for alignment logic 105 to synchronize data rate buffer 15 with the high speed burst data signals received ($\overline{XMP}$, $\overline{XMN}$) from and transmitted ($\overline{RMN}$, $\overline{RMP}$) to central switching controller 1. Output circuit 202 drives CSU 104 so as to produce bipolar data pulses and violations in response to W SYNC 1 and EMPTY signals from T buffer 101. Output circuit 202 and frame recovery 203 synchronize the transmission ($\overline{CXP}$, $\overline{CXN}$) and reception ($\overline{CRP}$, $\overline{CRN}$) of data between the data buffers 101 and 102 and control signaling unit (CSU) 104.

Frame recovery 203 provides data (DATA 3), word marker (SYNC) and frame marker (FRAME) for receive data buffer 102 and alignment logic unit 105. Frame recovery 203 also provides for frame resynchronization of data rate buffer 15. Frame synchronization is lost when the number of words received by data rate buffer 15, during the current frame, exceed the number of words in the prior frame. The system requires 2 frames to resynchronize to the new, longer frame. When the frame length is shortened frame synchronization is lost and requires one frame for resynchronization. Thus, the frames of data received by central switching controller 1 during these resynchronization periods must be disregarded.

These transition effects which occur when the number of words in a frame is changed can be incorporated into the mode of operation of central switching controller so as not to create any significant problems. Thus, if central switching controller 1 ignores two frames of data starting with the transition frame, the data that follows is valid data.

Channel Service Unit (CSU) 104 contains circuitry for driving and receiving over telephone facilities 16 and 17. CSU 104 is described in the article "Local Distribution System," *Bell System Technical Journal*, Vol. 54, No. 5, at page 937 et seq., May-June, 1975 by E. C. Bender et al, which is incorporated herein by reference.

Clock oscillator 205 provides the 1 MHZ, 100 KHz and 10 KHz clock pulses required by the various circuits. Clock phase recovery unit 204 determines the correct phase for strobing return data into the frame recovery 203 and receive data buffer 102 circuits.

Since the average data transmission rate over telephone facilities 16 and 17 is greater than the average data receptiion rate from central switching controller 1, transmit data buffer 101 will empty before the next high speed data frame arrives. CSUs 104 and 110 of FIG. 1 are designed to operate with a continuous data stream for synchronization reasons and hence when transmit data buffer 101 empties, filler bits are inserted to fill the resulting voids. CSUs 104 and 110 communicate with each other using a bipolar mode of transmission as described on page 920 of the previously cited article "Local Distribution System," Bell System Technical Journal, Volume 54, No. 5, May-June, 1975, by E. C. Bender et al. To distinguish data from the filler bits, the filler bits are bipolar violations (consecutive pulses of the same polarity) which are used by remote unit 18 and data rate buffer 15 as control bits. One bipolar violation is used to indicate the end of a word and multiple bipolar violations signify the end of a frame. At remote unit 18 one bipolar violation advances demultiplexer 103 pointer while multiple bipolar violations reset the pointer of demultiplexer 103. The pointer within multiplexer/demultiplexer 103 determines which station set is to transmit/receive data in a particular word position in a frame.

DETAILED DESCRIPTION

Figure 5:
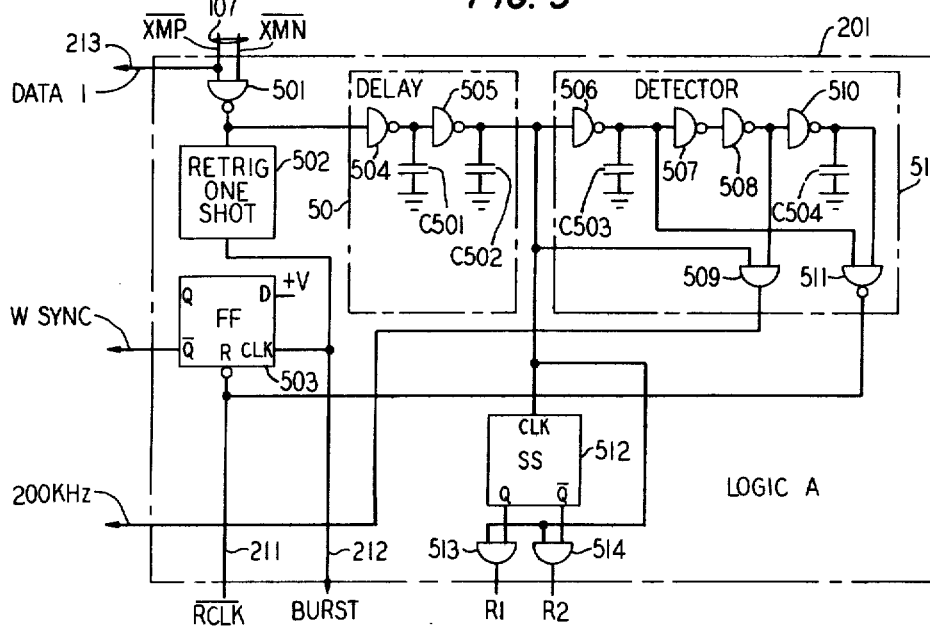
FIG. 5 shows the schematic of the logic "A" block of the data rate buffer.

Logic A (FIG. 5)

Figure 11:
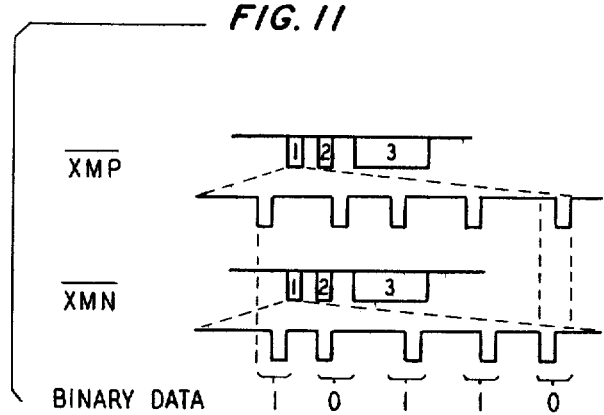
FIG. 11 illustrates the format of the data received from the central switching controller.

When a data bit is received from the central switching controller the leads XMP and XMN go low for 1 microsecond ($\mu$sec) as shown in FIG. 11. If $\overline{XMP}$ goes low first the data bit is a "1"; whereas, if $\overline{XMN}$ goes low first the data bit is a logic "0". Thus, as illustrated by the expanded $\overline{XMP}$ and $\overline{XMN}$ waveforms of FIG. 11 the first data bit of received word 1 is a logic 1 the second bit a zero and so forth. Turning now to FIG. 5 when $\overline{XMN}$ and $\overline{XMP}$ go low the output of NAND gate 501 goes high for 2 $\mu$sec. The output of gate 501 will pulse high for each bit of a data word.

Figure 13:
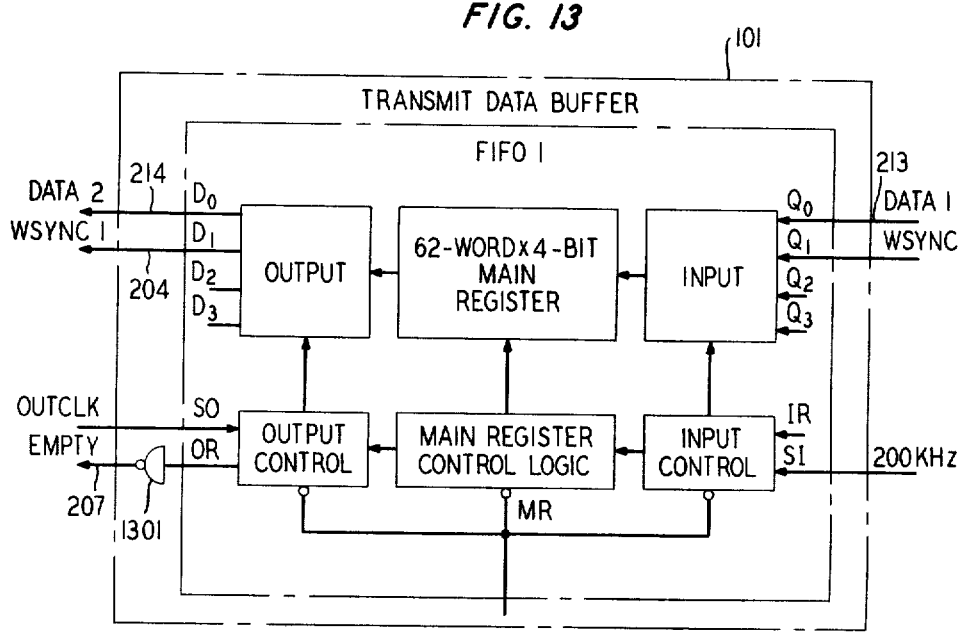
FIG. 13 shows the interconnection of a standard first-in first-out register as a transmit buffer block.

The first bit of a data word (a 200 kb/s burst) causes retriggerable single shot 502 to be triggered (BURST lead goes high) causing flip-flop 503 to be set (W SYNC low). The time constant of retriggerable single shot 502 is longer than the time between bits of the data word, thus BURST (the output of single shot 502) remains high for the duration of a word. The positive pulse output of gate 501 is delayed for a few tenths of a $\mu$sec by delay 50 consisting of gate 504 anc capacitor C501 and gate 505 and capacitor C502. The leading edge of the delayed output from gate 505 is detected by detector 51 consisting of gates 506 through 511 and capacitors C503 and C504. The tenth of a $\mu$sec spike generated by the output of gate 509 of detector 51 occurs at the leading edge of the pulse inputted to detector 51. This pulse labeled "200 KHz", is used to clock DATA 1 into the first channel of transmit data buffer 101 as shown in FIG. 13.

Figure 3:
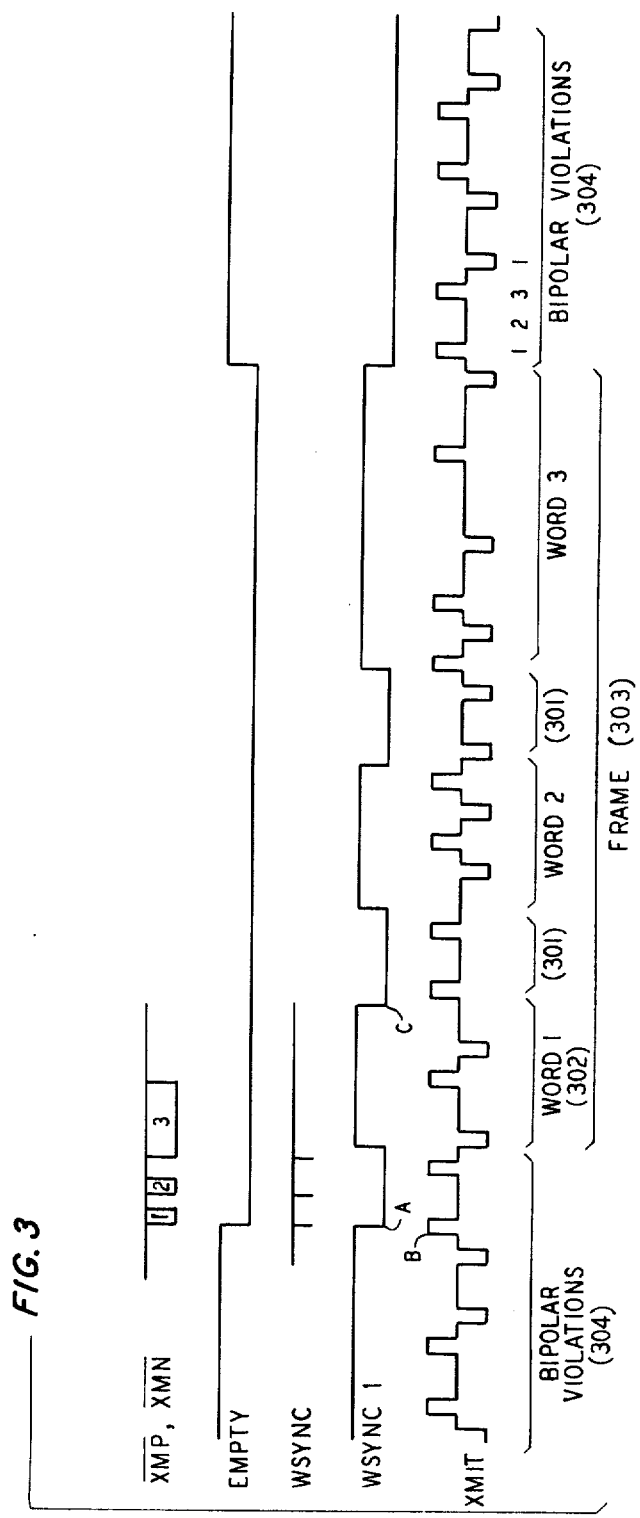
FIG. 3 illustrates the timing of data receptions by the data rate buffer from the central switching controller and transmissions to the remote unit.

The first bit of each data word is marked by a low level stored in a second parallel channel of transmit data buffer 101 (W SYNC, shown in FIG. 3). When both $\overline{XMP}$ and $\overline{XMN}$ (FIG. 3) go high, the trailing edge of the output of gate 505 is detected by detector 51. The output of gate 511 called $\overline{RCLK}$ pulses low at the delayed trailing edge of the data pulse doubles ($\overline{XMP}$, $\overline{XMN}$) inputted to detector 51 and resets flip-flop 503. Flip-flop 503 is not set again until the beginning of a new DATA 1 burst, indicating another word received. Therefore, W SYNC is low only when the first bit of each word is transmitted.

Single shot 512 is triggered at the CLK input by the leading edge of each delayed bit pulse from delay 50 and times out 1 $\mu$sec thereafter. Hence two 1 $\mu$sec pulses are generated, one at R1 followed by one at R2. These signals are connected to alignment logic circuit 105 and are used by alignment logic 105 for return bit timing, in the manner to be discussed.

Figure 6:
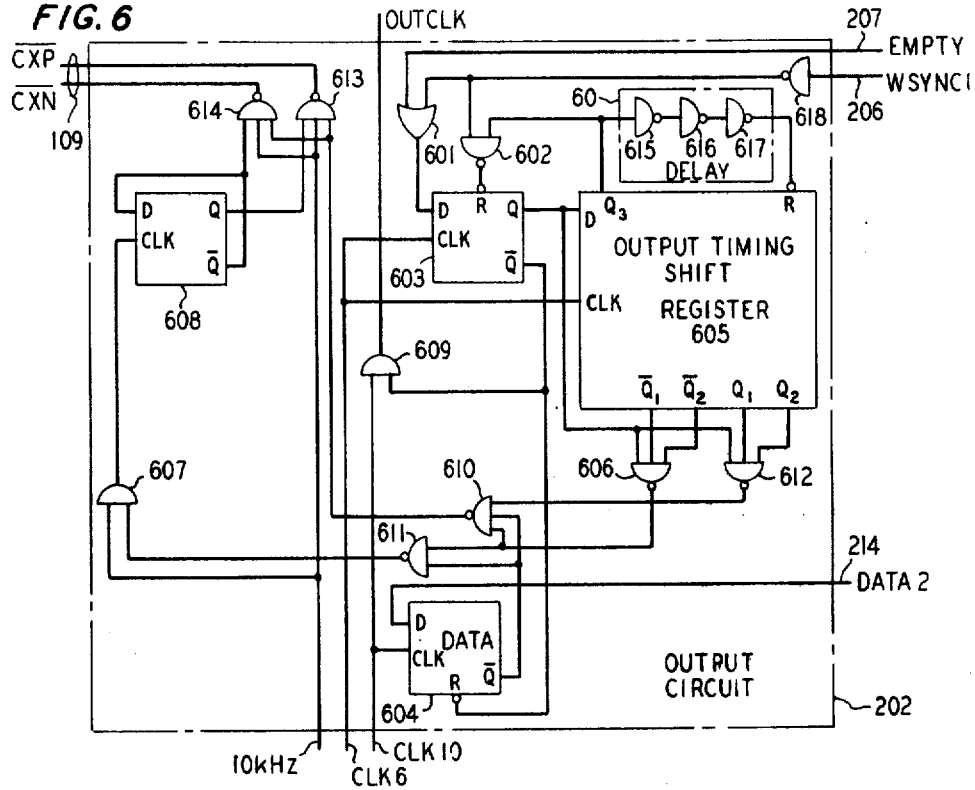
FIG. 6 shows the schematic of the output circuit block of the data rate buffer.

Output Circuit (FIG. 6)

Figure 12:
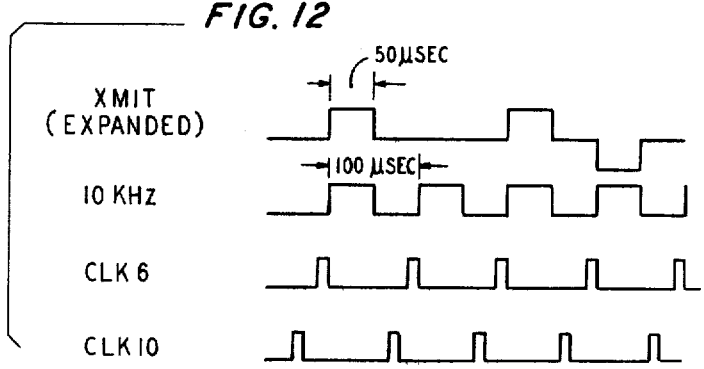
FIG. 12 illustrates the timing of various clock signals of the clock oscillator and timing block.

Output circuit 202 is shown in detail in FIG. 6. Three 10 KHz clock signals, namely, CLK 6, CLK 10 and 10 KHz, are required by output circuit 202. In FIG. 12 we see that the "10 KHz" clock signal is high half of the time. CLK 10 is a 5 $\mu$sec pulse which occurs just prior to the rising edge of the 10 KHz clock signal, whereas CLK 6 occurs somewhat earlier than CLK 10.

As previously mentioned a bipolar method of data transmission is used to transfer data over telephone facilities 16 and 17. Output circuit 202 receives binary data over the DATA 2 lead and generates signals $\overline{CXP}$ and $\overline{CXN}$ which cause the desired bipolar output pulses from CSU 104. In bipolar transmission a binary 1 is transmitted as a positive or negative pulse with successive binary 1 pulses alternating in polarity. Thus, there is an alternating polarity called a "bipolar pulse" for consecutive binary 1's. As an example, word 2 of the XMIT waveform shown in FIG. 3 illustrates the transmitted voltage waveform that would exist on facility 16 for a 01111 binary data word. Note, a binary 0 is transmitted as 0 volts.

Another characteristic of bipolar transmission is the additional information that can be conveyed by means of violations of the bipolar coding rule. Bipolar violations are generated by output circuit 202 when there is no data to transmit and results in consecutive low pulses on either $\overline{CXP}$ or $\overline{CXN}$. As shown in FIG. 2 the outputs $\overline{CXP}$ and $\overline{CXN}$ of output circuit 202 are connected to CSU 104. When $\overline{CXP}$ pulses low a positive pulse is outputted from CSU 104 to XMIT telephone facility 16 of FIG. 2. When $\overline{CXN}$ pulses low a negative pulse is transmitted over facility 16.

When FIFO 1 of FIG. 2 is empty (no date) the EMPTY lead is high and output circuit 202 operates to cause CXU 104 to output bipolar violations 304 (XMIT signal of FIG. 3), used as frame mark signals, to synchronize remote unit 18. The generation of these bipolar violations are described in the following sentences. Returning to FIG. 6, when EMPTY is high flip-flop 603 is set (Q is high) by the leading edge of CLK 6, since the output of gate 601 is high. Data flip-flop 604 is reset ($\overline{Q}$ of 604 high) by the low $\overline{Q}$ output of flip-flop 603. Output timing shift register 605 is clear from the last cycle ($\overline{Q1}$ and $\overline{Q2}$ high) and the output of gate 606 is low and output of gate 610 high. When "10 KHz" goes high, flip-flop 608 (wired with $\overline{Q}$ connected to D to form a toggle flip-flop) is clocked and either $\overline{CXP}$ (gate 613) or $\overline{CXN}$ (gate 614 pulses low, and a pulse of polarity opposite to the previous pulse is sent out by CSU 104. Thus, as shown in 304 of the XMIT waveform of FIG. 3, the first pulse of a bipolar violation has a polarity opposite the prior pulse.

With flip-flop 603 set, data is not strobed out of FIFO 1 since CLK 10 is blocked at gate 609 preventing a clock signal OUTCLK to transmit data buffer 101 shown in FIG. 2. When the second CLK 6 pulse (FIG. 12) arrives, a high level from flip-flop 603 is shifted into register 605 and $\overline{Q1}$ goes low causing output of gate 606 to go high and gate 611 to go low. The output of gate 610 will be low since output of gates 606 and 612 as well as $\overline{Q}$ of flip-flop 604 are high. The low output of gate 610 will disable gates 613 and 614, therefore, no $\overline{CXP}$ or $\overline{CXN}$ pulse is transmitted to CSU 104 and hence XMIT of FIG. 3 at time slot 2 has no data pulse on it.

On the third CLK 6 pulse Q1 and Q2 of register 605 are high which together with Q of flip-flop 603 high causes the output of gate 612 to go low and output of gate 610 to go high. Flip-flop 608 does not subsequently toggle because output of gate 611 is held low by a high on output of gate 606. Therefore, a pulse of the same polarity, as shown by XMIT waveform of FIG. 3 at time slot 3 of 304, is transmitted over leads $\overline{CXP}$ to CSU 104. When a fourth CLK 6 pulse arrives Q3 of register 605 goes high and register 605 is cleared through its reset (R) lead by delay unit 60 consisting of gates 615, 616 and 617. W SYNC 1 remains high and the low output of gate 618 will disable gate 602, hence flip-flop 603 remains set. With register 605 cleared ($\overline{Q1}$ and $\overline{Q2}$ high) and flip-flop 603 set the process repeats itself with flip-flop 608 toggling in the next slot (1) as shown by XMIT waveform of FIG. 3. The process continues so long as FIFO 1 remains empty. The multiple bipolar violations (each of opposite polarity) thus generated is used as a frame mark to synchronize remote unit 18.

Returning to FIG. 6 when data is received and strobed into FIFO 1 the logic signals EMPTY and W SYNC 1 go low. Note EMPTY and W SYNC 1 signals are asynchronous to the XMIT waveform. If EMPTY and W SYNC 1 go low just after a clock 6 pulse, which precedes the first pulse of a bipolar violation pair, then one more bipolar violation will be outputted. This condition is illustrated at location A of the W SYNC 1 waveform of FIG. 3. Note with reference to FIG. 12 that clock 6 pulses just precede the leading edges of data bits of the XMIT waveform. Returning to FIG. 3 if edge A of W SYNC 1 had occured somewhat prior to edge B of the bipolar violation shown in the XMIT waveform than no additional bipolar violation would be transmitted. Returning to FIG. 6, if this were so the next time that Q3 of register 605 is strobed high by CLK 6, it together with the high output of gate 618 causes a low output from gate 602 and flip-flop 603 is reset. After flip-flop 603 is reset, flip-flop 604 is clocked on the leading edge of CLK 10. CLK 10 pulses are also passed through enabled gate 609 (see OUTCLK) to transmit data buffer (101) of FIG. 2. Referring back to FIG. 6, data is loaded into flip-flop 604 over lead DATA 2 from FIFO 1 (101).

When the data received is a logic 0 flip-flop 604 resets ($\overline{Q}$ high), and the output of gates 610 and 611 are held low since Q of flip-flop 604 and the outputs of gates 606 and 612 are high. Therefore, no $\overline{CXP}$ or $\overline{CXN}$ pulse is transmitted and toggle flip-flop 608 is not clocked. When data received over DATA 2 is a logic "1" flip-flop 604 sets enabling gates 610 and 611 and flip-flop 608 toggles permitting a $\overline{CXN}$ pulse to be transmitted to CXU 104 resulting in a pulse of polarity opposite to the previous pulse (see time slot 1 of word 1 of XMIT in FIG. 3). As shown in the W SYNC 1 waveform W SYNC 1 will go high on the leading edge of the first data bit of a word. Data transmission continues in this manner until W SYNC 1 goes low again.

When W SYNC 1 goes low (see (c) FIG. 3), indicating the beginning of a new data burst, an additional bipolar violation is generated before the subsequent data is transmitted to remote unit 18. In this case EMPTY is low, W SYNC 1 goes low, and the output of "or" gate 601 therefore goes high. Flip-flop 603 is consequently set on the leading edge of CLK 6 and a violation cycle follows. Flip-flop 603 is reset at the end of the cycle when Q3 of flip-flop 605 goes high and data is clocked out of FIFO 1 into flip-flop 604 on the leading edge of CLK 10. W SYNC 1 goes high at this time and data transmission will begin.

Output circuit 202 thus assures that a continuous stream of data words each separated by on bipolar violation will be sent to remote unit 18, when central switching controller 1 transmits a series of closely spaced data bursts. Note, central switching controller must not let transmit data buffer 101 empty until the last remote telephone has been scanned since an empty transmit buffer generates multiple bipolar violations which indicate a new frame of data to remote unit 18. A frame is a complete scan of all remote stations. Each frame is separated by multiple bipolar violations while words of each frame are separated by a single bipolar violation.

Figure 9:
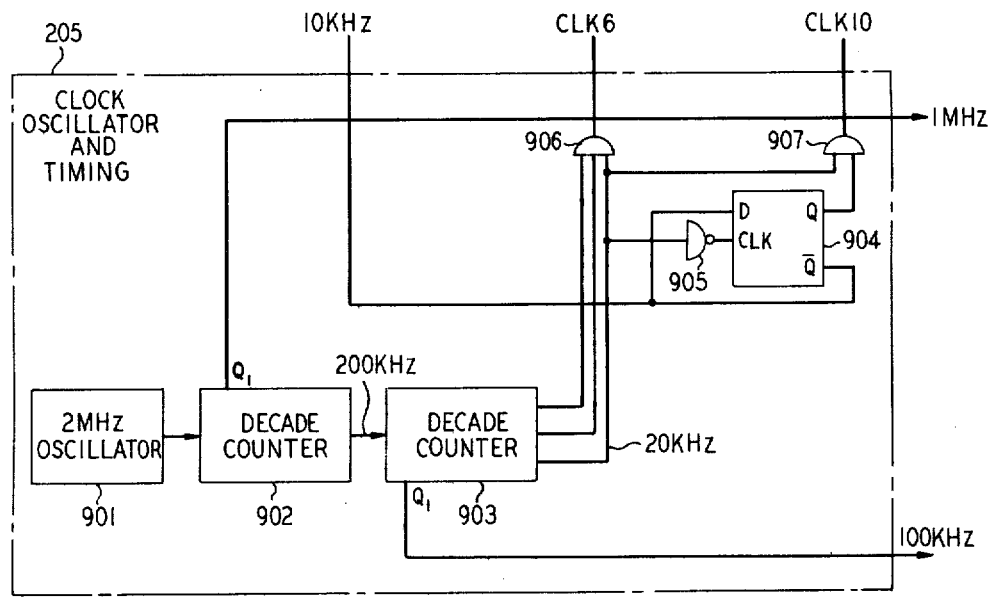
FIG. 9 shows the schematic of the clock oscillator and timing block of the data rate buffer.

Clock Oscillator and Timing (FIG. 9)

The master clock is a 2 MHz crystal oscillator (901). The 100 KHz, 10 KHz, CLK 6, and CLK 10 signals are derived from standard well known counting circuits (902 and 903) together with flip-flop 904 and decoding gates 905 through 907 connected as shown in FIG. 9. Note, while the master clock in the disclosed embodiment is independent of central switching controller 1, it is not essential that it be independent.

CSU (104) of FIG. 2

The CSU (channel service unit) is described fully on pp. 919 through 941 of the previously cited May–June, 1975 issue of the *Bell System Technical Journal* which is incorporated herein by reference. The basic design of CSU 104 is also very similar to the design of the bipolar repeater described in the article "A Bipolar Repeater for Pulse Code Modulation Signals," *Bell System Technical Journal*, Vol. 41, at page 25 et seq., Jan. 1962 by J. S. Mayo, which is incorporated herein by reference. CSU 104 contains circuitry for driving telephone facility 16 and reconstructing the pulses received over telephone facility 17.

Figure 8:
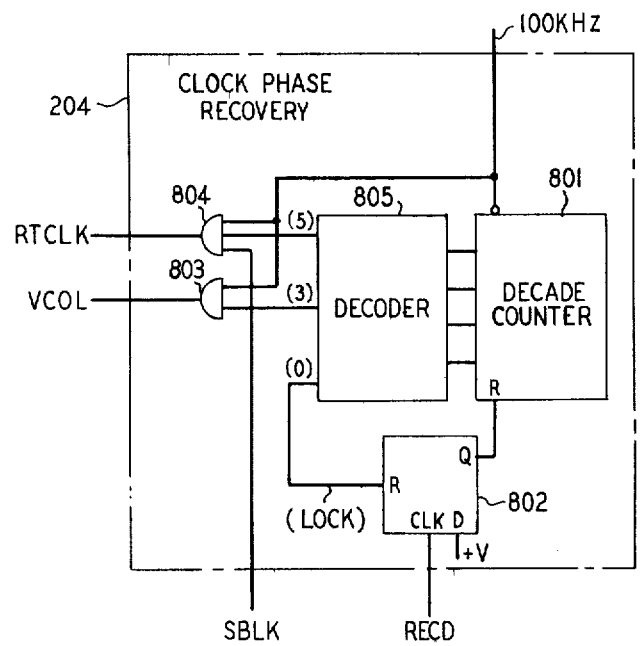
FIG. 8 shows the schematic of the clock phase recovery block of the data rate buffer.

Clock Phase Recovery (FIG. 8)

Since the data rate from remote unit 18 is known to be 10 Kbs, data rate buffer 15 need only determine the phase delay for synchronization with remote unit 18. The 100 KHz clock is used to strobe decade counter (801) of FIG. 8. When a pulse is received at CSU 104 either $\overline{CRP}$ or $\overline{CRN}$ of FIG. 2 goes low and signal RECD, the output of gate 701 of FIG. 7 goes high. If counter 801 of FIG. 8 is not in the zero state then the "0" output of decoder 805 is low and flip-flop 802 is set on the leading edge of RECD, and counter 801 is subsequently reset at terminal R. When counter 801 resets, the "0" output of decoder 805 clears flip-flop 802 via the R terminal. Thirty μsec later when the count reaches 3 clock pulse VCOL is outputted by gate 802 at a time when the data is stable. Note from FIG. 12 that each bit of the 10 Kbs cycle occupies a 100 μsec interval, the first 50 μsec slot contains the data and the second 50 μsec slot is always logic 0. Thus, stable data is assured by clocking at 30 μsec.

Returning to FIG. 8 the pulse RTCLK, used for strobing data into receive data buffer 102 is generated by gate 804 when counter 801 reaches Count 5. The signal SBLK is used to inhibit RTCLK as discussed in a subsequent section.

Figure 14:
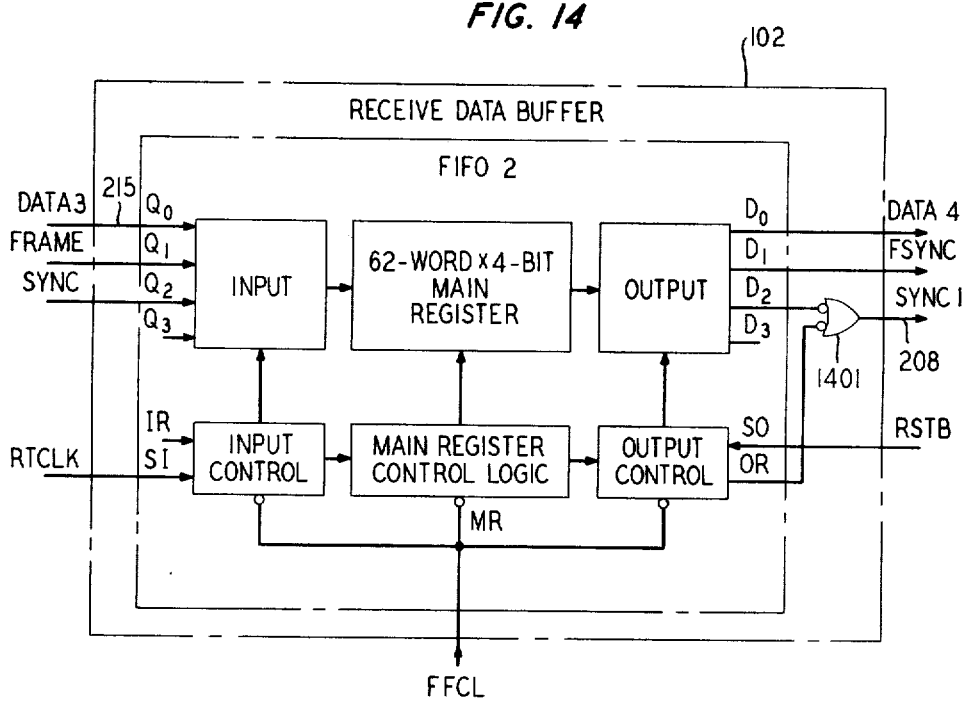
FIG. 14 shows the interconnection of a standard first-in first-out register as a receive buffer block.

Data Buffers (FIG. 13 and 14)

Figure 15:
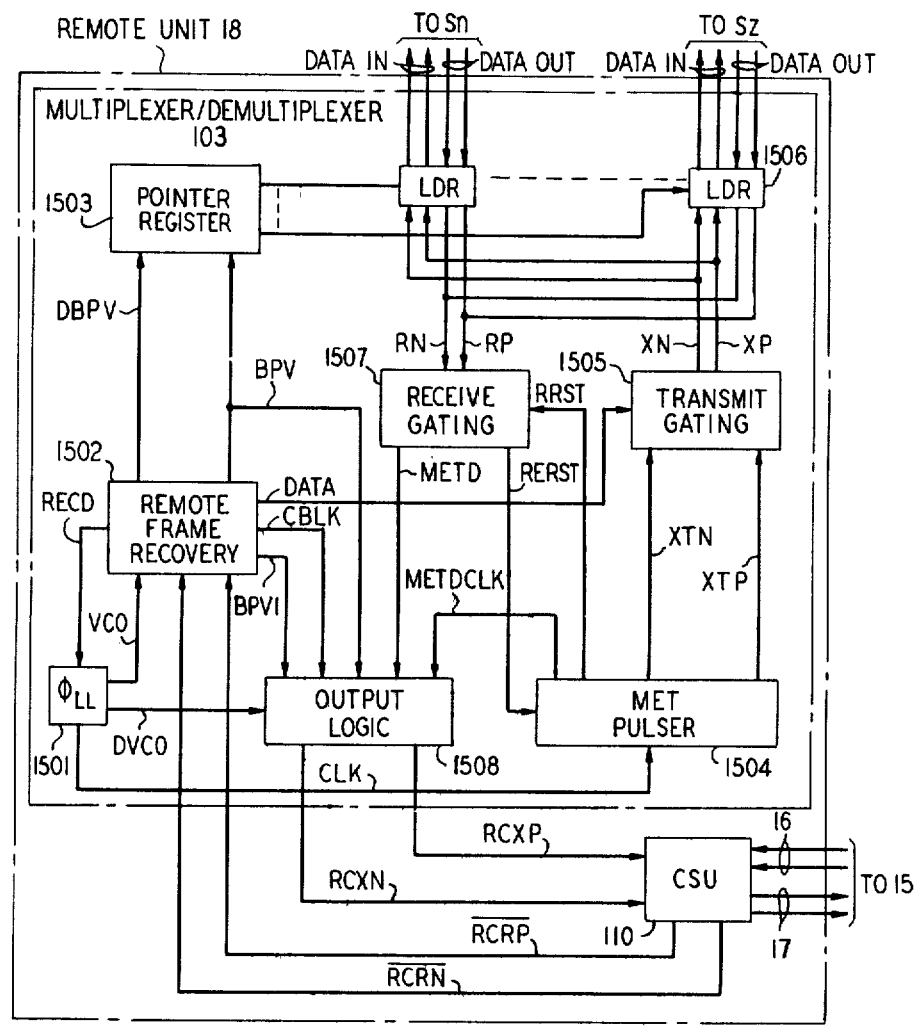
FIG. 15 shows a block diagram of one embodiment of a remote unit.

Transmit buffer 101 and receive buffer 102 are implemented using commercially available first-in first-out devices such as Fairchild's 3341 as shown by FIFO 1 and FIFO 2 in FIG. 14 and 15 respectively. Four cascaded Fairchild 3341 FIFOs have the memory capacity to store one frame of data from central switching controller 1. The operating conditions of the Fairchild 3341 first-in first-out devices is described on pages 3–35 of the MOS ICCD Data Book published in 1975, which is incorporated herein by reference.

The use of a FIFO as a data rate buffer is described in the *Fairchild Camera* technical disclosure T-46-01, reprint from Sept. 1974 *Progress*, Vol. 1, No. 4, written by George Landers entitled, "FIFO First In First Out", which is incorporated herein by reference. The article explains the use of FIFO's in systems which require the collection of data at a slow or irregular rate, storage, and the processing of that data at high speed. The article also explains the use of FIFO's in data rate buffering systems that require high speed data to be absorbed by a slower speed system.

As shown in FIG. 13, one channel of FIFO 1 is used to store the high speed data (DATA 1) and one channel is used to store information $\overline{W\ SYNC}$ indicating the length of a received high speed daata word. A signal EMPTY indicates the size of a received frame of data words. As shown in FIG. 14, one channel of FIFO 2 is used to store data (DATA 3), one channel is used to store information SYNC associated with the length of received low speed data word and one channel is used to store information FRAME associated with the size of the frame of low speed data words.

Figure 7:
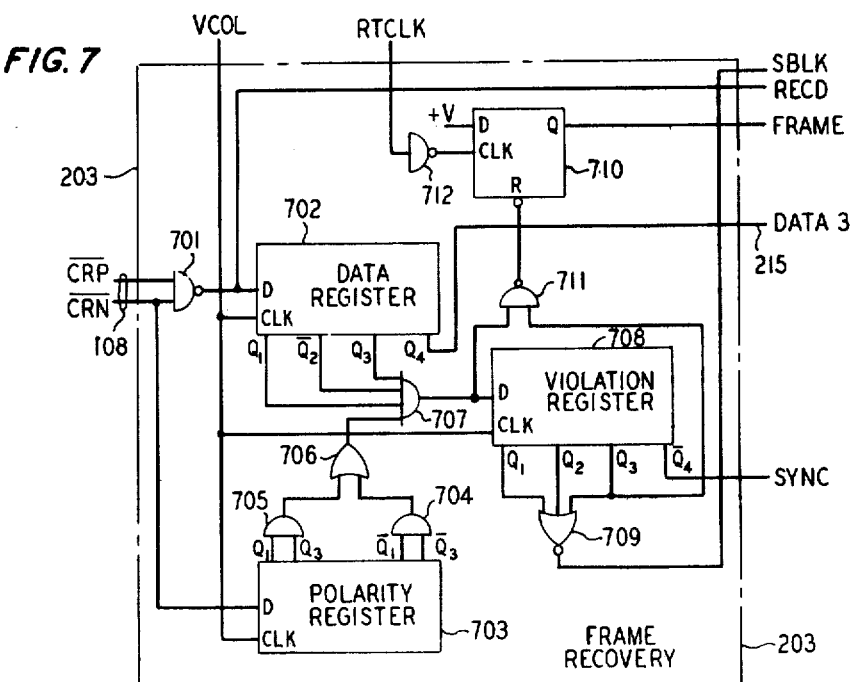
FIG. 7 shows the schematic of the frame recovery block of the data rate buffer.

Frame Recovery (FIG. 7)

Figure 4:
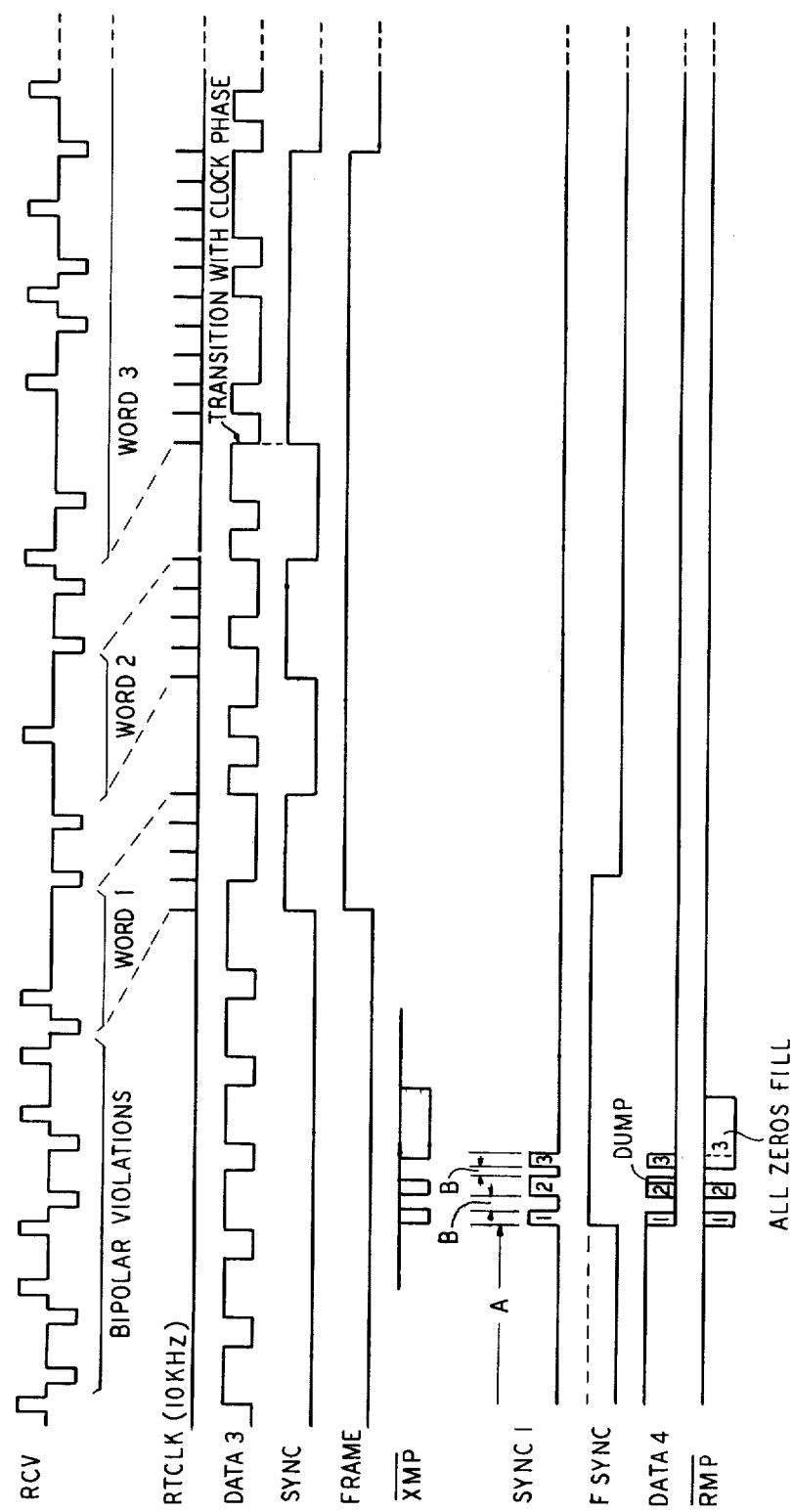
FIG. 4 illustrates the timing of data transmissions from the remote unit to the data rate buffer and from the data rate buffer to the central switching controller.

Data signals $\overline{CRP}$ and $\overline{CRN}$ from CSU 104 are connected to NAND gate 701 to obtain a 10 Kbs binary data stream signal RECD. The data is strobed into register 702 and the data polarity "$\overline{CRN}$" is strobed into register 703 using VCOL as a clock pulse. When a "1 0 1" data sequence is present in register 702 and the polarity of both "1's" in register 703 is the same gates 704, 705, 706 and 707 decode this condition and output a high level signal into register 708, indicating that a bipolar violation has been detected. Referring to RCV signal of FIG. 4, it is seen that only bipolar violations have the "101" data pattern with both 1's having the same polarity. Returning to FIG. 7, the data 3 output is delayed 4 bits by register 702 so that any bipolar violation pulses may be stripped out of the daata stream. When a violation bit, a high level signal, is at output Q1, Q2 or Q3 of violation register 708, the output of gate 709 SBLK will be low. As noted before in FIG. 8 when SBLK is low, it blocks RTCLK clock pulses aat gate 804 from being outputted to the receive data buffer 102 of FIG. 2. As shown in FIG. 4 a RTCLK pulse is generated for each bit of a valid data word. Thus, receive data buffer 102 of FIG. 2 stores only valid data words received over DATA 3 lead when clock pulse RTCLK occurs.

Returning to FIG. 7, when the first bit of a valid data word reaches Q4 (DATA 3) of register 702, the data in violation register 708 has propagated to Q4 therefore, SYNC is low. This signal (SYNC) is used to mark the first bit in each word and is stored in a second channel of receive data buffer 102 as discussed previously.

When the first data bit of a frame (i.e., followng multiple violation) from DATA 3 lead is strobed into receive buffer 102 on the leading edge of RTCLK, FRAME 1 the output of flip-flop 710 is clocked high by gate 712. Note, when multiple violations are being received flip-flop 710 is held reset by output of gate 711 since Q3 of register 708 and output of gate 707 are high at this time. In this manner multiple violations are detected and signal FRAME (as shown in FIG. 4) is low until the first data word of a frame is received. Referring to FIG. 8, RTCLK is inhibited by SBLK. RTCLK pulses only when SBLK is high. Referring to FIG. 7, SBLK is high only when $Q_1$ through $Q_3$ of register 708 are low and the last violation indication bit reaches $Q_4$ making SYNC low. Data from DATA 3 lead of register 702, word sync marks from SYNC lead of register 708 and frame marks from FRAME lead of flip-flop 710 are loaded into separate parallel channels of the receive data buffer 102.

As shown in FIG. 4, the leading edge of SYNC denotes the first bit of the data word and the leading edge of FRAME the first bit of the frame. As shown in FIG. 2, DATA 3, SYNC and FRAME signals ripple through and emerge on the other side of receive buffer 102 as signals DATA 4, SYNC 1 and F SYNC. DATA 4, SYNC 1 and F SYNC operate in a 200 Kbs time frame when RSTB clock pulses are applied to receive buffer 102.

Figure 10:
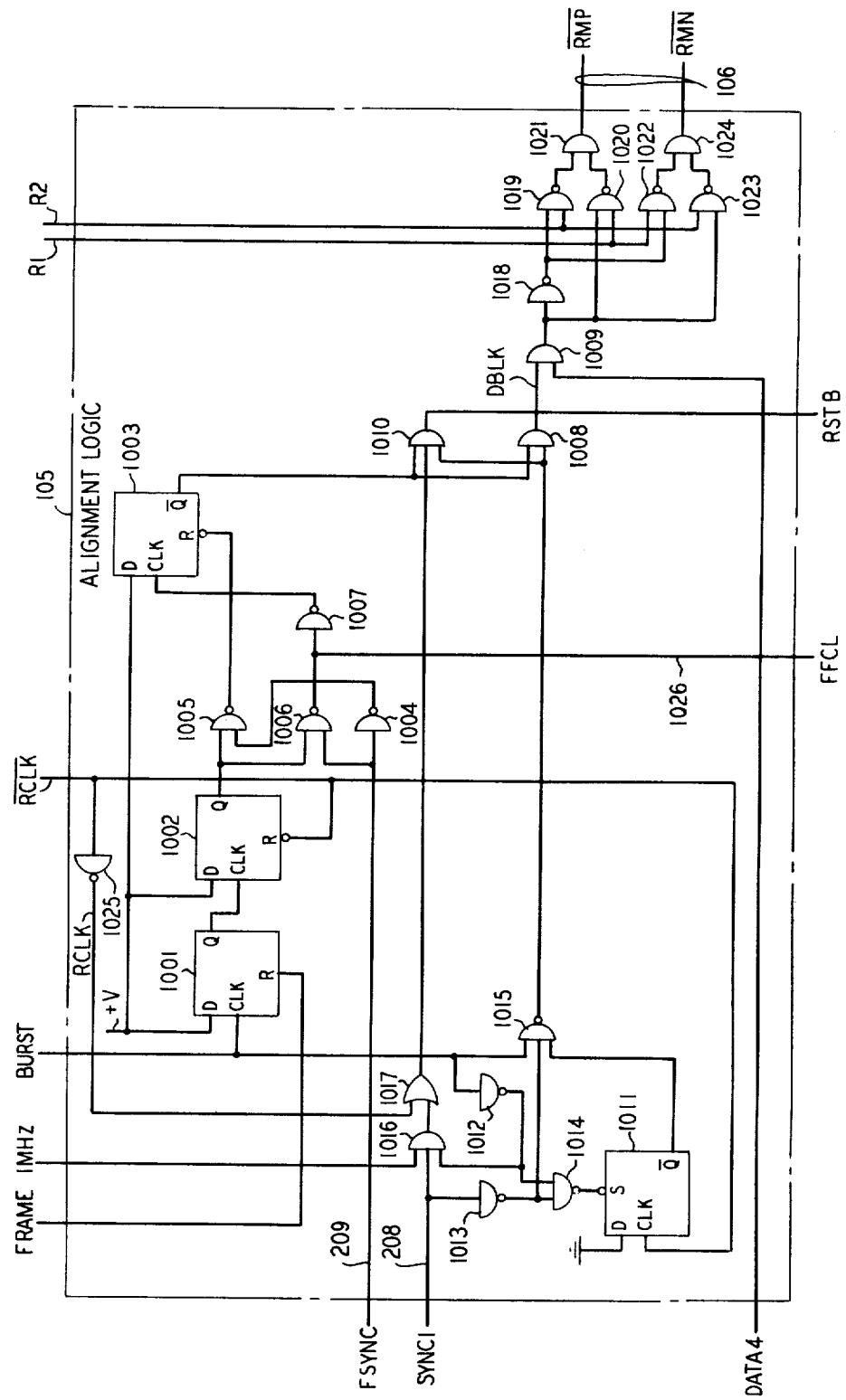
FIG. 10 shows the schematic of the alignment logic block of the data rate buffer.

Alignment Logic (FIG. 10)

Frame Alignment

In the disclosed system a frame of data corresponds to one polling scan of the MET station sets (SN through SZ of FIG. 1). Each word of a frame is associated with a particular MET station. When the last word in a frame is transmitted to Remote unit 18 (see word 3 of XMIT in FIG. 3) transmit data buffer 101 is emptied (EMPTY goes high) and multiple bipolar violations are transmitted (XMIT) over facility 16 to remote unit 18. At this time, see time slot A of FIG. 4, the first bit of the previous frame is at the output side of receive buffer 102 and appears on lead DATA 4 while SYNC 1 and F SYNC outputs are low.

With reference to FIG. 10, when multiple violations are returned from remote module 18, FRAME signal of FIG. 4 goes low and no longer hold flip-flop 1001 in the reset state. When the first bit in a new frame of data is received from central switching system 1, BURST signal goes high and flip-flops 1001 and 1002 are set. Flip-flop 1002 is reset after the first bit has been strobed into transmit buffer 101 (i.e., when $\overline{RCLK}$ pulses low). Flip-flop 1001 is reset when data from remote UNIT 18 propagates back to receive buffer 102 in response to the prior frame of data, that is, when FRAME goes high. Hence, flip-flop 1002 remains set during the first bit interval of each transmitted frame.

With reference to time slot A of FIG. 4, if F SYNC is high prior to the first bit of a data word being transmitted ($\overline{XMP}$), this indicates frame synchronization has been lost as shown by the dotted line of F SYNC lead.

One circumstance which causes a loss of frame synchronization occurs when central switching controller 1 changes the number of stations polled (the number of data words per frame is changed). The number of stations polled by central controller 1 may change periodically with time to more efficiently handle the needs at a station. Thus the stations having status changes that are less critical or changes that occur more slowly will not be updated as rapidly. An example of such a station might be a utility meter, water, gas, etc. that may occasionally be scanned along with the telephones. When the number of stations polled increases the number of words in a frame will increase proportionally.

When the number of words received by data rate buffer 15, during the current frame, exceed the number of words in the prior frame (i.e., the words to be transmitted to central switching controller 1) a loss of frame synchronization occurs. The system requires 2 frames to resynchronize to the new longer frame length. The frame of data received by central switching controller 1 coincident with the first transmitted longer frame, must be disregarded since it may contain erroneous data in the additional words received. This occurs if the length of the new frame on low speed channels 16 and 17 is longer than 800 μsec (i.e., if data from the current frame is returned before receive buffer 102 empties). If the length of the increased frame length is less than 800 μsec then zeroes will be returned in the additional words returned to central controller 1.

The frame of data received by the central switching controller 1 coincident with the second increased length frame transmitted contains all zeroes as described in a subsequent paragraph. Hence, only two frames of data are lost during the transition of adding new words to a frame.

When the number of words in the current frame received by data rate buffer 15 is less than the number of words in the prior frame, the system requires one frame to resynchronize. The frame of data received by central switching controller 1 coincident with the shorter frame transmitted by it contains valid data. However, the data received by central switching controller 1 coincident with the second transmitted shorter frame contains all zeroes and is to be ignored. The method by which this occurs is described in a subsequent paragraph.

The transition effects which occur when the number of words in a frame is changed can be incorporated into central switching controller 1 mode of operation so as not to create any significant problems. Thus, if central switching controller 1 ignores two frames of data starting with the transition frame, the frames of data that follow are valid data.

With reference to FIG. 10 when synchronization is lost FFCL, the output of detector gate 1006, goes low for one bit interval determined by Q output of flip-flop 1002 and flip-flop 1003 is set through gate 1007. The lead FFCL connects to the reset lead of receive data buffer 102 (see FIG. 14). Hence, when FFCL goes low, FIFO 2 is reset. Since flip-flop 1003 is set $\overline{Q}$ is low and data from receiver data buffer 102 (DATA 4 lead) is inhibited by gate 1009 since the output of gate 1008 is low. Flip-flop 1003 will also inhibit gate 1010 and clock pulses RSTB to receive data buffer 102.

Since the output of gate 1009 is low and output of gate 1018 is high, gates 1020 and 1023 are inhibited and gates 1019 and 1022 are enabled. Thus, when signal R1 pulses high the output of gate 1022 goes low and $\overline{RMN}$ pulses low. Later, when signal R2 pulses high the output of gate 1019 goes low and $\overline{RMP}$ pulses low. As noted earlier a $\overline{RMN}$ pulse followed by a $\overline{RMP}$ pulse is interpreted by central switching controller 1 as a logic zero. Thus, while the output of gate 1009 is held low, logic zeroes are returned to the central switching controller over $\overline{RMP}$ and $\overline{RMN}$ leads.

When receive data buffer 102 is cleared (by FFCL) and output clock RSTB is inhibited, then receive data buffer 102 is subsequently loaded with a new frame of return data from remote unit 18 and F SYNC is low when the first bit of the next frame is transmitted from the central switching controller 1. With F SYNC low FFCL remains high and flip-flop 1003 is reset by the low output of gate 1005 enabling normal data transmission. Assuming that output of gate 1015 is high the output of 1008 is high and data on lead DATA 4, from receive data buffer 102, will be gated through the enabled gates 1009 and 1018 through 1024 to the leads $\overline{RMP}$ and $\overline{RMN}$.

Word Size Alignment

It is not efficient for central switching controller 1 to send and receive fixed word lengths to each station since different stations have different numbers of lamps and buttons (thus different word lengths). In addition, for example, only a few bits are required to check on a change in the status of a MET set; whereas, a long scanning word is required to refresh the state of the MET lamps. Since the status of a station does not change often, most remote MET stations require only a short scan and only one or two stations require long scans. Thus, the number of remote MET stations that can be supported on a 10 Kbs telephone facility can be increased. The word length is made variable from frame to frame to allow for an interactive polling capability of the system. Thus, only those remote MET stations indicating a change in status receive a full scan on the next scan cycle from central switching controller 1.

When a remote MET station Sn is added or subtracted and hence number of words transmitted (frame size) is changed, frame sync is lost and subsequently recovered within two scan cycles. However, variations in word length within each frame is compensated for without a loss in frame synchronism. Loss of frame synchronism is not a normal operating state since MET stations are not frequently added or deleted. The number of MET stations, however, does vary from installation to installation. The word alignment circuits which enable the change in word size without a loss in synchronization are described in the following parapraphs.

Equal Word Lengths

Between data words BURST and SYNC 1 signals are low as shown in time slot B of FIG. 4. Therefore, flip-flop 1011 is set through gates 1012, 1013, and 1014. When BURST goes high the output of gate 1015 remains high due to $\bar{Q}$ output of flip-flop 1011. Gates 1008 and 1010 enabled by gate 1015 allow normal data transmission operation through gate 1009. The data out of gate 1009 is gated by R1 and R2 through the gates 1019-1024 as described in a previous paragraph.

After the first bit in a data word has been loaded into transmit buffer 101 and a bit has been returned to central switching controller 1, $\overline{RCLK}$ pulses low and RCLK high through gate 1025. RCLK is passed through gates 1017 and 1010 to RSTB. Gate 1010 is enabled since flip-flop 1003 is reset following a frame check. The RSTB pulses strobe data out of receive buffer 102. SYNC 1 goes high during the transmission of a word from receive buffer 102. Flip-flop 1011 is then reset as $\overline{RCLK}$ goes high. Normal data transmission operation continues with output of gate 1015 remaining high because SYNC 1 has driven output gate 1013 low. Thus, R1 and R2 clock data to leads $\overline{RMP}$ and $\overline{RMN}$.

When the end of a word is reached, SYNC 1 goes low followed by BURST and flip-flop 1011 is set and the cycle is ready to start over again.

Shorter Transmitted Word

Assume that a scanning word to a station during the current frame is shorter than the corresponding scanning word in the previous frame. This is illustrated with reference to word 2 of the $\overline{XMP}$ and SYNC 1 waveforms shown in FIG . 4. When BURST goes low following the transmission of a data word, SYNC 1 will still be high because part of the longer return word remains in FIFO 2. This condition causes a 1 MHz clock to be gated through gates 1016, 1017 and 1010 to RSTB lead. The excess data is therefore dumped out of receive buffer 102 (see DATA 4 of FIG. 4) until the next word is reached and SYNC 1 goes low. Hence, the length of the word transmitted to the central switching controller 1 (see $\overline{RMP}$ of FIG. 4) equals the word length received from the central switching controller 1 (see $\overline{XMP}$ of FIG. 4).

Longer Transmitted Word

The following description references word 3 of the $\overline{XMP}$ and SYNC 1 waveforms shown in FIG. 4. Assume the scanning data word (word 3 of $\overline{XMP}$) transmitted by central switching controller 1 to a station is longer than the prior scanning word (word 3 of SYNC 1) transmitted. In this case SYNC 1 goes low after the last available bit has been returned at $\overline{RMP}$ and $\overline{RMN}$. Referring to FIG. 10 the output of gate 1013 goes high and since $\bar{Q}$ of flip-flop 1011 is high and BURST is high the output of gate 1015 is driven low. Thus, normal data transmission at gate 1008 and 1010 is inhibited. That is, data is not strobed out since there are no RSTB clock pulses to receive buffer 102. Thus, "Zeroes" are outputted at $\overline{RMP}$ and $\overline{RMN}$ since output of gate 1008 is low. This process continues until R1 and R2 pulses cease and BURST goes low setting flip-flop 1011 which inhibits gate 1015.

Hence, the length of the word transmitted to central switching controller 1 (see word 3 of $\overline{RMP}$ of FIG. 4) is filled with zeroes to equal the length of the word received from central switching controller 1 (see word 3 of $\overline{XMP}$ of FIG. 4).

With reference to FIG. 14, it should be noted that an empty condition (a low level at terminal OR) at receive buffer 102 is also gated through gate 1401 as a word length mark. Therefore, if a short frame is transmitted by central controller 1 and receive buffer 102 is empty due to lack of return data, a return of zeroes for filler bits is guaranteed.

Remote Unit FIG. 15

Remote unit 18 shown in FIG. 1 is shown in block diagram form in FIG. 15. FIG. 15 describes one type of remote unit which could multiplex/demultiplex information from the high speed data sets (Sn-Sz of FIG. 1) into the low speed data format. Multiplexer/demultiplexer 103 of FIG. 1 is comprised of all the units of FIG. 15 except CSU 110. The low speed data as illustrated by XMIT of FIG. 3 and RCV of FIG. 4 is communicated over facilities 16 and 17 to data rate buffer 15. Remote unit 18 functions in a delayed bit synchronous mode, transmitting a bit delayed by 4 bit times for each bit received. Many of the function blocks utilized in remote Unit 18 perform very similar functions to those functions previously described as part of data rate buffer 15 and hence can be similarly implemented.

As shown in FIG. 1 data is received by remote 18 from data rate buffer 15 over facility 16 and data is transmitted to data rate buffer 15 over facility 17. Channel service unit (CSU) 110 is identical to CSU 104 of data rate buffer 15 and interfaces remote module 18 to line facilities 16 and 17.

With reference to FIG. 15 signals similar to $\overline{CXP}$ and $\overline{CXN}$ of FIG. 2 are regenerated by CSU 110 as signals $\overline{RCRP}$ and $\overline{RCRN}$. When either of these signals goes low the RECD signal out of Remote frame recovery Unit 1502 goes high indicating the reception of a pulse. Phase lock loop ($\phi$LL) 1501 is required, because the clock frequency is not known at remote module 18. It is essential that a sufficient number of pulses (bipolar violations and "1's") be transmitted from data rate buffer 15 to keep $\phi$LL 1501 locked in.

Remote frame recovery 1502 operates similar to frame recovery 203 of FIG. 7, to distinguish valid data from bipolar violations. Note this bipolar violation detection process results in a delay of 4-bit intervals in the reception of data. When a single violation (BPV) is detected pointer register 1503 is stepped to the next remote station (Sn through Sz) whereas, when multiple violations (DBPV) occur, the pointer is reset to the first station (Sn).

When a bipolar violation is detected by remote frame recovery 1502, transmission to and from the MET stations is interrupted and a bipolar violation is returned to facility 17 through output signals RCXP and RCXN of output logic 1508. Output pulses RCXP and RCXN are derived from signal DVCO of φLL 1501. A delayed BPV signal, BPV1, and a signal BPV indicating the presence of a bipolar violation in frame logic 1502 are also required for driving the output logic 1508.

When the bipolar violations have cleared frame recovery 1502, the MET pulsing logic 1504 is strobed by the data clock (CLK). MET logic 1504 produces two 1 μsec pulses, one pulse on lead XTP followed by one pulse on lead XTN. Data stored in frame recovery 1502 is gated out over DATA lead to the appropriate MET set through transmit gating 1505 and over leads XN and XP to one of the line drivers (LDR) 1506 selected by pointer register 1503. The receiving met station returns information, in bit synchronism with the information received, to LDR 1506. This information is transferred over leads RN and RP to receive gating 1507 which subsequently strobes the data over lead METD through output logic 1508 to transmission facility 17. Lead METDCLK from MET pulser 1504 provides clock pulses to output logic 1508.

In this manner remote module 18 channels data to each of the remote MET sets, returns data from the MET sets and returns directly any bipolar violation markets received.

In the prior described embodiment the following standard commercially available TTL integrated circuits were used. In the figures of this application, all integrated circuits that are identically illustrated or labeled are of the same type. The table below lists the integrated circuits and references an example of the illustration used for such integrated circuits in this specification.

| gates | |
|---|---|
| inverters (FIG. 5, gate 504) | SN7404 |
| 2 input NAND gates (FIG. 5, 501) | SN7400 |
| 2 input AND gates (FIG. 5, 513) | SN7408 |
| 3 input NAND gates (FIG. 6, 613) | SN7410 |
| 4 input AND gates (FIG. 7, 707) | SN7420 |
| 2 input OR gates (FIG. 6, 601) | SN7432 |
| 3 input NOR gates (FIG. 7, 709) | SN7427 |
| other circuitry | |
| D type flip-flop (FIG. 5, 503) | SN7474 |
| J-K type flip-flop (FIG. 5, 512) | SN7473 |
| single shot (FIG. 5, 502) | SN74123 |
| Shift register (FIG. 6, 605) | SN74175 |
| Shift register (FIG. 7, 702) | SN74175 |
| Decade counter (FIG. 8, 801) | SN7490 |
| Decoder (FIG. 8, 805) | SN74154 |

What has been described is illustrative of the invention; other embodiments known to those skilled in the art could provide similar functions without deviating from the scope of the disclosed invention.

I claim:

1. A communication system (15, 18) for bidirectional transmission between a high frequency burst data signal operated first apparatus (1) and a low frequency data signal operated second apparatus (18), said first apparatus having an average data bit transmission rate lower than average data bit transmission rate of said second apparatus, said system including a data rate buffer (15) for bidirectionally communicating with said first apparatus (1) utilizing high frequency burst data signals, said data rate buffer arranged for converting said high frequency burst signals to low frequency data signals for communication to said second apparatus (18), and arranged for converting said low frequency data signals from said second apparatus (18) to said high frequency burst signals for communication to said first apparatus (1), said data rate buffer (15) including a buffer circuit (101, 102) for converting a first high frequency signal (107) to a first low frequency signal (109), and for converting a second low frequency signal (108) to a second high frequency signal (106), characterized in that there is provided a buffer control circuit (201–205, 105) for interactively controlling said buffer circuit, said buffer control circuit comprising a first synchronizing circuit (201, 105) for bit synchronizing the transmission of each said second high frequency signal (106) from said buffer circuit (101, 102) to said first apparatus (1) with the reception of bits of said first high frequency signal (107) by said buffer circuit (101, 102) from said first apparatus (1), and alignment logic (105) for adjusting the number of bits in said second high frequency signal (106) transmitted from said buffer circuit (101, 102) to said first apparatus (1) to be equal to the number of bits in said first high frequency signal (107) received by said buffer circuit (101, 102) from said first apparatus (1), said number of bits of said second high frequency signal (106) being adjustable without affecting said bit synchronism of said data rate buffer (15) with said first apparatus (1).

2. A communication system (15, 18) of claim 1 characterized in that said second apparatus (18) is arranged for demultiplexing received said first low frequency signal (109) to a third low frequency signal for transmission to a third apparatus (Sn), and for multiplexing a fourth low frequency signal from said third apparatus (Sn) to said second low frequency signal (108).

3. A communication system (15, 18) of claim 2 characterized in that said second apparatus (18) is arranged for synchronizing communications with said data rate buffer (15) by detecting the presence of bipolar violations in received said first low frequency signal (109) for use as word and frame length control signals and by generating said bipolar violations for transmission with said second low frequency signal (108) as word and frame length control signals.

4. A communication system (15, 18) of claim 1 characterized in that said buffer circuit (101, 102) is arranged as a first buffer (101) for converting said first high frequency signal (107) to said first low frequency signal (109), and a second buffer (102) for converting said second low frequency signal (108) to a said second high frequency signal (106).

5. A communication system (15, 18) of claim 4 characterized in that said buffer control circuit (201-205, 105) further includes a second synchronizing circuit (202, 203) for synchronizing communications between said low frequency apparatus (18) and said data rate buffer (15), said second synchronizing means using a bipolar violation (301) as a control bit for separating each data word signal (302) and multiple bipolar violations (304) for separating frames (303) of data consisting of a group of said data word signals (302).

6. A communication system (15, 18) of claim 5 characterized in that said data rate buffer (15) further includes a frame synchronization detector circuit (1001-1007), and a circuit for frame resynchronization (102, 1001-1007) of a first frame of data of said second high frequency signals (106) transmitted to said high frequency apparatus (1) with a second frame of data of said first high frequency signals (107) received from said high frequency apparatus (1), said circuit adapted to clear contents of said second buffer (102) in response to a loss of synchronization signal (1026) from said detector circuit (1001-1007), said loss of synchronization signal occurring when the length of said first frame is not equal to the length of said second frame, said circuit enabling resynchronization within two frames of data words (303) after detection of said loss of synchronization.

7. A communication system (15, 18) of claim 4 characterized in that said first buffer (101) has a first signal (206) indicating the length of each said first high frequency signal (107) received, and a second signal (207), indicating the size of a frame of said first high frequency signals received;

said second buffer (102) has a third signal (208), indicating the length of each said second high frequency signal (106) transmitted from said second buffer, a fourth signal (209), indicating the size of a frame of said second high frequency signals (106) transmitted from said second buffer, and a fifth signal (210) indicating the size of a frame of said second low frequency signal (108) received by said second buffer (102);

said buffer control circuit (201-205, 105) including a logic circuit (201) having a sixth signal (211) for providing a clock signal for each bit of received said first high frequency signal (107) and a seventh signal (212), indicating the length of received said first high frequency signal (107);

said first synchronizing circuit (201, 105) consisting of said logic circuit (201) and said alignment logic (105), said logic circuit (201) generating a sixth signal (211) for bit synchronizing the transmission of each said second high frequency signal (106) from said alignment logic (105) with the reception of bits of said first high frequency signal (107); and said alignment logic (105) acting in response to said third (208), fourth (209), fifth (210), sixth (211), and seventh (212) signals for adjusting on a bit basis the length of said second high frequency signal (106) transmitted from said second buffer (102) to be equal in length to said first high frequency signal (107) received by said first buffer (101).

8. A communication system (15, 18) of claim 7 characterized in that said second synchronizing circuit (202, 203) utilizes said first (206) and said second (207) signals to synchronize on a word basis the reception of said second low frequency signals (108) by said second buffer (102) in synchronism with the transmission of said first low frequency signal (109) by said first buffer (101).

9. A communication system (15, 18) of claim 8 characterized in that said data rate buffer (15) operates such that the conversion of said first low frequency signal (109) is asynchronous with respect to reception of bursts of said first high frequency signal (107) and conversion to bursts of said second high frequency signal (106) is asynchronous with respect to reception of said second low frequency signal (108).

10. A communication system (15, 18) of claim 9 characterized in that said data rate buffer (15) operates such that the conversion of a received frame of data words, consisting of a group of bursts of said first high frequency signals (107), occurs in synchronism with a corresponding frame of data words of said first low frequency signals (109) transmitted from said rate buffer (15), and the conversion of a received frame of data words of said second low frequency signals (106) occurs in synchronism with a frame of data words of said second high frequency signals (108) transmitted from said rate buffer (15).

11. A data communications system (15, 18) of claim 4 characterized in that said first buffer (101) and second buffer (102) include a multichanneled first-in first-out serial memory.

12. A communication system (15, 18) of claim 4 characterized in that said data rate buffer (15) further includes an internal clock which is independent of any signal of said high frequency apparatus (1) or low frequency apparatus (18), said clock arranged to provide internal timing of said data rate buffer.

13. A communication system (15, 18) for bidirectional transmission of high frequency burst data signals between a first apparatus (1) and a third apparatus (Sn) over low frequency telephone transmission facilities (16, 17) said high frequency signals having an average bit rate lower than the average bit rate of said low frequency telephone facility, said system including a data rate buffer (15) for bidirectionally communicating with said first apparatus (1) utilizing high frequency burst data signals, said data rate buffer (15) arranged for converting said high frequency burst signals to low speed data signals for communications over said low frequency telephone facilities (16, 17), and arranged for converting said low frequency data signals received over said telephone facilities (16, 17) to high speed burst data signals, a second apparatus (18) for communicating with said data rate buffer (15) at said low frequency signal rate over said telephone facilities (16, 17), said second apparatus (18) arranged for interfacing said low frequency signals with signals of said third apparatus (Sn), said data buffer (15) including a buffer circuit (101, 102) for converting a first high frequency signal (107) to a first low frequency signal (109), and for converting a second low frequency signal (108) to a second high frequency signal (106), characterized in that there is provided a buffer control circuit (201-205, 105) for interactively controlling said buffer circuit, said buffer control circuit comprising a first synchronizing circuit (201, 105) for bit synchronizing the transmission of each said second high frequency signal (106) from said buffer circuit (101, 102) to said first apparatus (1) with the reception of bits of said first high frequency signal (107) by said buffer circuit (101, 102) from said first apparatus (1), and alignment logic (105) for adjusting the number of bits in said second high frequency signal (106) transmitted from said buffer circuit (101, 102) to said first apparatus (1) to be equal to the number of bits in said first high frequency signal (107) received by said buffer circuit (101, 102) from said first apparatus (1), said number of bits of said second high frequency signal (106) being adjustable without affecting said bit synchronism of said data rate buffer (15) with said first apparatus (1).

14. A communication system (15, 18) of claim 13 characterized in that said second apparatus (18) is arranged for synchronizing communications with said data rate buffer (15) by detecting the presence of said bipolar violations in received said first low frequency signal (109) for use as word and frame length control signals and by generating said bipolar violations for transmission with said second low frequency signal (108) as word and frame length control signals.

15. A communication system (15, 18) of claim 13 characterized in that said buffer circuit (101, 102) is arranged as a first buffer for converting said first high frequency signal (107) to said first low frequency signal (109), and a second buffer for converting said second low frequency signal (108) to a said second high frequency signal (106).

16. A communication system (15, 18) of claim 15 characterized in that said buffer control circuit (201-205, 105) further includes a second synchronizing circuit (202, 203) for synchronizing communications between said low frequency apparatus (18) and said data rate buffer (15), said second synchronizing means using a bipolar violation (301) as a control bit for separating each data word signal (302) and multiple bipolar violations (304) for separating frames (303) of data consisting of a group of said data word signals (302).

17. A communication system (15, 18) of claim 16 characterized in that said data rate buffer (15) operates such that the conversion of a received frame of data words, consisting of a group of bursts of said first high frequency signals (107), occurs in synchronism with a corresponding frame of data words of said first low frequency (109) signals transmitted from said rate buffer (15), and the conversion of a received frame of data words of said second low frequency signals (106) occurs in synchronism with a frame of data words of said second high frequency signals (108) transmitted from said rate buffer (15).

18. A communication system (15, 18) of claim 17 characterized in that said first buffer (101) has a first signal (206) indicating the length of each said first high frequency signal (107) received, and a second signal (207), indicating the size of a frame of said first high frequency signals received;

said second buffer (102) has a third signal (208), indicating the length of each said second high frequency signal (106) transmitted from said second buffer, a fourth signal (209), indicating the size of a frame of said second high frequency signals (106) transmitted from said second buffer, and a fifth signal (210) indicating the size of a frame of said second low frequency signal (108) received by said second buffer (102);

said buffer control circuit (201-205, 105) including a logic circuit (201) having a sixth signal (211) for providing a clock signal for each bit of received said first high frequency signal (107) and a seventh signal (212), indicating the length of received said first high frequency signal (107);

said first synchronizing circuit (201, 105) consisting of said logic circuit (201) and said alignment logic (105), said logic circuit (201) generating a sixth signal (211) for bit synchronizing the transmission of each said second high frequency signal (106) from said alignment logic (105) with the reception of bits of said first high frequency signal (107); and said alignment logic (105) acting in response to said third (208), fourth (209), fifth (210), sixth (211), and seventh (212) signals for adjusting on a bit basis the length of said second high frequency signal (106) transmitted from said second buffer (102) to be equal in length to said first high frequency signal (107) received by said first buffer (101).

19. A communication system (15, 18) of claim 18 characterized in that said second synchronizing circuit (202, 203) utilizes said first (206) and said second (207) signals to synchronize on a word basis the reception of said second low frequency signals (108) by said second buffer (102) in synchronism with the transmission of said first low frequency signal (109) by said first buffer (101).

20. A communication system (15, 18) of claim 19 characterized in that said data rate buffer (15) operates such that the conversion to said first low frequency signal (109) is asynchronous with respect to reception of bursts of said first high frequency signal (107) and conversion to bursts of said second high frequency signal (106) is asynchronous with respect to reception of said second low frequency signal (108).

21. A communication system (15, 18) of claim 20 characterized in that said data rate buffer (15) further includes a detector circuit (1001-1007), and a circuit for frame resynchronization (102, 1001-1007) of a first frame of data of said second high frequency signals (106) transmitted to said high frequency apparatus (1) with a second frame of data of said first high frequency signals (107) received from said high frequency apparatus (1), said circuit adapted to clear contents of said second buffer (102) in response to a loss of synchronization signal (1026) from said detector circuit (1001-1007), said loss of synchronization signal occurring when the length of said first frame is not equal to the length of said second frame, said circuit enabling resynchronization within two frames of data words (303) after detection of said loss of synchronization.

22. A data communication system (15, 18) of claim 15 characterized in that
said first buffer (101) and second buffer (102) include a multichanneled first-in first-out serial memory.

23. A communication system (15, 18) of claim 15 characterized in that
said data rate buffer (15) further includes an internal clock which is independent of any signal of said high frequency apparatus (1) or low frequency apparatus (18), said clock arranged to provide internal timing of said data rate buffer.

24. A bidirectional data rate buffer (15) for interfacing apparatus (1) which utilizes bidirectional high frequency burst data signals (106, 107) with apparatus (18) which utilizes bidirectional low frequency data signals (108, 109), said high frequency data signals (106, 107) having an average data rate lower than the data rate of said low frequency data signals (108, 109) said data buffer (15) including
a buffer circuit (101, 102) for converting a first high frequency signal (107) to a first low frequency signal (109), and for converting a second low frequency signal (108) to a second high frequency signal (106),
characterized in that
there is provided a buffer control circuit (201-205, 105) for interactively controlling said buffer circuit, said buffer control circuit comprising
a first synchronizing circuit (201, 105) for bit synchronizing the transmission of each said second high frequency signal (106) from said buffer circuit (101, 102) to said first apparatus (1) with the reception of bits of said first high frequency signal (107) by said buffer circuit (101, 102) from said first apparatus (1), and
alignment logic (105) for adjusting the number of bits in said second high frequency signal (106) transmitted from said buffer circuit (101, 102) to said first apparatus (1) to be equal to the number of bits in said first high frequency signal (107) received by said buffer circuit (101, 102) from said first apparatus (1), said number of bits of said second high frequency signal (106) being adjustable without affecting said bit synchronism of said data rate buffer (15) with said first apparatus (1).

25. A data rate buffer (15) of claim 24 characterized in that
said buffer circuit (101, 102) is arranged as a first buffer for converting said first high frequency signal (107) to said first low frequency signal (109), and a second buffer for converting said second low frequency signal (108) to a said second high frequency signal (106).

26. A data rate buffer 15 of claim 25 characterized in that
said buffer control circuit (201-205, 105) further includes a second synchronizing circuit (202, 203) for synchronizing communications between said low frequency apparatus (18) and said data rate buffer (15), said second synchronizing means using a bipolar violation (301) as a control bit for separating each data word signal (302) and multiple bipolar violations (304) for separating frames (303) of data consisting of a group of said data word signals (302).

27. A data rate buffer of claim 26 characterized in that
said data rate buffer (15) operates such that the conversion of a received frame of data words, consisting of a group of bursts of said first high frequency signals (107), occurs in synchronism with a corresponding frame of data words of said first low frequency (109) signals transmitted from said rate buffer (15), and the conversion of a received frame of data words of said second low frequency signals (106) occurs in synchronism with a frame of data words of said second high frequency signals (108) transmitted from said rate buffer (15).

28. A data rate buffer (15) of claim 27 characterized in that
said first buffer (101) has a first signal (206) indicating the length of each said first high frequency signal (107) received, and a second signal (207), indicating the size of a frame of said first high frequency signals received;
said second buffer (102) has a third signal (208) indicating the length of each said second high frequency signal (106) transmitted from said second buffer, a fourth signal (209), indicating the size of a frame of said second high frequency signals (106) transmitted from said second buffer, and a fifth signal (210) indicating the size of a frame of said second low frequency signal (108) received by said second buffer (102);
said buffer control circuit (201-205, 105) including a logic circuit (201) having a sixth signal (211) for providing a clock signal for each bit of received said first high frequency signal (107) and a seventh signal (212), indicating the length of received said first high frequency signal (107);
said first synchronizing circuit (201, 105) consisting of said logic circuit (201) and said alignment logic (105), said logic circuit (201) generating a sixth signal (211) for bit synchronizing the transmission of each said second high frequency signal (106) from said alignment logic (105) with the reception of bits of said first high frequency signal (107); and
said alignment logic (105) acting in response to said third (208), fourth (209), fifth (210), sixth (211), and seventh (212) signals for adjusting on a bit basis the length of said second high frequency signal (106) transmitted from said second buffer (102) to be equal in length to said first high frequency signal (107) received by said first buffer (101).

29. A data rate buffer of claim 28 characterized in that
said second synchronizing circuit (202, 203) utilizes said first (206) and said second (207) signals to synchronize on a word basis the reception of said second low frequency signals (108) by said second buffer (102) in synchronism with the transmission of said first low frequency signal (109) by said first buffer (101).

30. A data rate buffer (15) of claim 29 characterized in that
said data rate buffer (15) operates such that the conversion to said first low frequency signal (109) is asynchronous with respect to reception of bursts of said first high frequency signal (107) and conversion to bursts of said second high frequency signal (106) is asynchronous with respect to reception of said second low frequency signal (108).

31. A data rate buffer (15) of claim 30 characterized in that
said data rate buffer (15) further includes a frame synchronization detector circuit (1001-1007), and a circuit for frame resynchronization (102, 1001-1007) of a first frame of data of said second high frequency signals (106) transmitted to said high frequency apparatus (1) with a second frame of data of said first high frequency signals (107) received from said high frequency apparatus (1), said circuit adapted to clear contents of said second buffer (102) in response to a loss of synchronization signal (1026) from said detector circuit (1001-1007), said loss of synchronization signal occurring when the length of said first frame is not equal to the length of the second frame, said circuit enabling resynchronization within two frames of data words (303) after detection of said loss of synchronization.

32. A data rate buffer (15) of claim 25 characterized in that
said first buffer (101) and second buffer (102) include a multichanneled first-in first-out serial memory.

33. A data rate buffer (15) of claim 25 characterized in that
said data rate buffer (15) further includes an internal clock which is independent of any signal of said high frequency apparatus (1) or low frequency apparatus (18), said clock arranged to provide internal timing of said data rate buffer.

34. A data rate buffer (15) for both receiving a first high frequency data signal for conversion to a transmitted preselected first low frequency signal, and for transmitting a second high frequency signal from a converted received preselected second low frequency signal, said first and second high frequency signals being identical in frequency and said first and second low frequency signal being identical in frequency, said data rate of said high frequency signals being less than data rate of said low frequency signal over a frame period, said converter including a memory (101, 102) having a storage capacity at least as great as the amount of high frequency or low frequency data received in said frame period
characterized in that
there is provided a buffer control circuit (201-205, 105) for controlling said buffer (101, 102) said control circuit (201-205, 105) including
a first phase regulating circuit for synchronizing the phase of transmitted said second high frequency signal with received said first high frequency signal, and
an adjusting circuit (105) for adjusting the bit length of transmitted said second high frequency signal to be equal to received said first high frequency signal.

35. A data rate buffer (15) of claim 34 characterized in that
said buffer circuit (101, 102) is arranged as a first buffer for converting said first high frequency signal (107) to said first low frequency signal (109) and a second buffer for converting said second low frequency signal (108) to a said second high frequency signal (106).

36. A data rate buffer 15 of claim 35 characterized in that
said buffer control circuit (201-205, 105) further includes a second synchronizing circuit (202, 203) for synchronizing communications between said low frequency apparatus (18) and said data rate buffer (15), said second synchronizing means using a bipolar violation (301) as a control bit for separating each data word signal (302) and multiple bipolar violations (304) for separating frames (303) of data consisting of a group of said data word signals (302).

37. A data rate buffer of claim 36 characterized in that
said data rate buffer (15) operates such that the conversion of a received frame of data words, consisting of a group of bursts of said first high frequency signals (107), occurs in synchronism with a corresponding frame of data words of said first low frequency (109) signals transmitted from said rate buffer (15), and the conversion of a received frame of data words of said second low frequency signals (106) occurs in synchronism with a frame of data words of said second high frequency signals (108) transmitted from said rate buffer (15).

38. A data rate buffer (15) of claim 37 characterized in that
said first buffer (101) has a first signal (206) indicating the length of each said first high frequency signal (107) received, and a second signal (207), indicating the size of a frame of said first high frequency signals received;
said second buffer (102) has a third signal (208), indicating the length of each said second high frequency signal (106) transmitted from said second buffer, a fourth signal (209), indicating the size of a frame of said second high frequency signals (106) transmitted from said second buffer, and a fifth signal (210) indicating the size of a frame of said second low frequency signal (108) received by said second buffer (102);
said buffer control circuit (201-205, 105) including a logic circuit (201) having a sixth signal (211) for providing a clock signal for each bit of received said first high frequency signal (107) and a seventh signal (212), indicating the length of received said first high frequency signal (107);
said first synchronizing circuit (201, 105) consisting of said logic circuit (201) and said alignment logic (105), said logic circuit (201) generating a sixth signal (211) for bit synchronizing the transmission of each said second high frequency signal (106) from said alignment logic (105) with the reception of bits of said first high frequency signal (107); and
said alignment logic (105) acting in response to said third (208), fourth (209), fifth (210, sixth (211), and seventh (212) signals for adjusting on a bit basis the length of said second high frequency signal (106) transmitted from said second buffer (102) to be equal in length to said first high frequency signal (107) received by said first buffer (101).

39. A data rate buffer of claim 38 characterized in that
said second synchronizing circuit (202, 203) utilizes said first (206) and said second (207) signals to synchronize on a word basis the reception of said second low frequency signals (108) by said second buffer (102) in synchronism with the transmission of said first low frequency signal (109) by said first buffer (101).

40. A data rate buffer (15) of claim 39
characterized in that
said data rate buffer (15) operates such that the conversion to said first low frequency signal (109) is asynchronous with respect to reception of bursts of said first high frequency signal (107) and conversion to bursts of said second high frequency signal (106) is asynchronous with respect to reception of said second low frequency signal (108).

41. A data rate buffer (15) of claim 40
characterized in that
said data rate buffer (15) further includes a frame synchronization detector circuit (1001–1007), and a circuit for frame resynchronization (102, 1001–1007) of a first frame of data of said second high frequency signals (106) transmitted to said high frequency apparatus (1) with a second frame of data of said first high frequency signals (107) received from said high frequency apparatus (1), said circuit adapted to clear contents of said second buffer (102) in response to a loss of synchronization signal (1026) from said detector circuit (1001–1007), said loss of synchronization signal occurring when the length of said first frame is not equal to the length of said second frame, said circuit enabling resynchronization within two frames of data words (303) after detection of said loss of synchronization.

42. A data rate buffer (15) of claim 35
characterized in that
said first buffer (101) and second buffer (102) include a multichanneled first-in first-out serial memory.

43. A data rate buffer (15) of claim 35
characterized in that
said data rate buffer (15) further includes an internal clock which is independent of any signal of said high frequency apparatus (1) or low frequency apparatus (18), said clock arranged to provide internal timing of said data rate buffer.

* * * * *